United States Patent
Liu et al.

(10) Patent No.: US 11,676,283 B2
(45) Date of Patent: *Jun. 13, 2023

(54) ITERATIVELY REFINING SEGMENTATION MASKS

(71) Applicant: Adobe Inc., San Jose, CA (US)

(72) Inventors: Zichuan Liu, San Jose, CA (US); Wentian Zhao, San Jose, CA (US); Shitong Wang, San Jose, CA (US); He Qin, San Jose, CA (US); Yumin Jia, San Jose, CA (US); Yeojin Kim, Seoul (KR); Xin Lu, Mountain View, CA (US); Jen-Chan Chien, Saratoga, CA (US)

(73) Assignee: Adobe Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/660,361

(22) Filed: Apr. 22, 2022

(65) Prior Publication Data

US 2022/0245824 A1    Aug. 4, 2022

Related U.S. Application Data

(63) Continuation of application No. 16/988,408, filed on Aug. 7, 2020, now Pat. No. 11,335,004.

(51) Int. Cl.
*G06T 7/11* (2017.01)

(52) U.S. Cl.
CPC ...... *G06T 7/11* (2017.01); *G06T 2207/20084* (2013.01)

(58) Field of Classification Search
CPC .................. G06T 7/11; G06T 2207/20084
See application file for complete search history.

(56) References Cited

U.S. PATENT DOCUMENTS

| 7,295,700 | B2 | 11/2007 | Schiller et al. |
| 7,606,417 | B2 | 10/2009 | Steinberg et al. |

(Continued)

FOREIGN PATENT DOCUMENTS

| CN | 106339591 A | 1/2017 |
| CN | 107103315 A | 8/2017 |

(Continued)

OTHER PUBLICATIONS

U.S. Appl. No. 16/376,704, Jun. 14, 2022, Office Action.

(Continued)

*Primary Examiner* — Bobbak Safaipour
(74) *Attorney, Agent, or Firm* — Keller Preece PLLC

(57) ABSTRACT

The present disclosure relates to systems, methods, and non-transitory computer-readable media that generate refined segmentation masks for digital visual media items. For example, in one or more embodiments, the disclosed systems utilize a segmentation refinement neural network to generate an initial segmentation mask for a digital visual media item. The disclosed systems further utilize the segmentation refinement neural network to generate one or more refined segmentation masks based on uncertainly classified pixels identified from the initial segmentation mask. To illustrate, in some implementations, the disclosed systems utilize the segmentation refinement neural network to redetermine whether a set of uncertain pixels corresponds to one or more objects depicted in the digital visual media item based on low-level (e.g., local) feature values extracted from feature maps generated for the digital visual media item.

20 Claims, 13 Drawing Sheets

(56) References Cited

U.S. PATENT DOCUMENTS

| | | | |
|---|---|---|---|
| 7,916,917 | B2 | 3/2011 | Dewaele et al. |
| 8,600,143 | B1 | 12/2013 | Kulkarni et al. |
| 8,675,934 | B2 | 3/2014 | Wehnes et al. |
| 9,251,429 | B2 | 2/2016 | Pham et al. |
| 9,418,319 | B2 | 8/2016 | Shen et al. |
| 9,495,756 | B2 | 11/2016 | Rivet-Sabourin |
| 9,684,967 | B2 | 6/2017 | Abedini et al. |
| 10,192,129 | B2 | 1/2019 | Price et al. |
| 10,210,613 | B2 | 2/2019 | Xu et al. |
| 10,460,214 | B2 | 10/2019 | Lu et al. |
| 10,470,510 | B1 | 11/2019 | Koh et al. |
| 10,643,331 | B2 | 5/2020 | Ghesu et al. |
| 10,679,046 | B1 | 6/2020 | Black et al. |
| 10,846,566 | B2 | 11/2020 | Zhu et al. |
| 11,335,004 | B2* | 5/2022 | Liu ............... G06T 7/11 |
| 2001/0051852 | A1 | 12/2001 | Sundaravel et al. |
| 2003/0081833 | A1 | 5/2003 | Tilton |
| 2004/0042662 | A1* | 3/2004 | Wilensky ............ G06V 10/267 |
| | | | 382/194 |
| 2004/0190092 | A1 | 9/2004 | Silverbrook et al. |
| 2004/0202368 | A1 | 10/2004 | Lee et al. |
| 2006/0045336 | A1 | 3/2006 | Lim |
| 2006/0285743 | A1 | 12/2006 | Oh et al. |
| 2007/0165949 | A1 | 7/2007 | Sinop et al. |
| 2009/0252429 | A1 | 10/2009 | Prochazka et al. |
| 2010/0183225 | A1 | 7/2010 | Vantaram et al. |
| 2010/0226566 | A1 | 9/2010 | Luo et al. |
| 2010/0322488 | A1 | 12/2010 | Virtue et al. |
| 2011/0188720 | A1 | 8/2011 | Narayanan et al. |
| 2011/0216975 | A1 | 9/2011 | Rother et al. |
| 2011/0285874 | A1 | 11/2011 | Showering et al. |
| 2012/0201423 | A1 | 8/2012 | Onai et al. |
| 2014/0010449 | A1 | 1/2014 | Haaramo et al. |
| 2014/0056472 | A1* | 2/2014 | Gu ............... G06V 10/7715 |
| | | | 382/103 |
| 2014/0334667 | A1 | 11/2014 | Eswara et al. |
| 2015/0117783 | A1 | 4/2015 | Lin et al. |
| 2015/0269427 | A1 | 9/2015 | Kim et al. |
| 2016/0232425 | A1 | 8/2016 | Huang et al. |
| 2017/0032551 | A1 | 2/2017 | Fried et al. |
| 2017/0116497 | A1 | 4/2017 | Georgescu et al. |
| 2017/0140236 | A1 | 5/2017 | Price et al. |
| 2017/0169313 | A1 | 6/2017 | Choi et al. |
| 2017/0169567 | A1 | 6/2017 | Chefd'hotel et al. |
| 2017/0213349 | A1 | 7/2017 | Kuo et al. |
| 2017/0231550 | A1 | 8/2017 | Do et al. |
| 2017/0244908 | A1 | 8/2017 | Flack et al. |
| 2017/0249739 | A1 | 8/2017 | Kallenberg et al. |
| 2017/0287137 | A1* | 10/2017 | Lin ............... G06N 3/08 |
| 2018/0061046 | A1 | 3/2018 | Bozorgtabar et al. |
| 2018/0108137 | A1 | 4/2018 | Price et al. |
| 2018/0137335 | A1 | 5/2018 | Kim et al. |
| 2018/0182101 | A1 | 6/2018 | Petersen et al. |
| 2018/0240243 | A1 | 8/2018 | Kim et al. |
| 2019/0057507 | A1 | 2/2019 | El-Khamy et al. |
| 2019/0108414 | A1 | 4/2019 | Price et al. |
| 2019/0236394 | A1 | 4/2019 | Price et al. |
| 2019/0130229 | A1 | 5/2019 | Lu et al. |
| 2019/0340462 | A1 | 11/2019 | Pao et al. |
| 2019/0357615 | A1 | 11/2019 | Koh et al. |
| 2020/0143194 | A1 | 5/2020 | Hou et al. |
| 2020/0167930 | A1 | 5/2020 | Wang et al. |
| 2020/0388071 | A1* | 12/2020 | Grabner ............ G06T 17/20 |
| 2021/0027098 | A1 | 1/2021 | Ge et al. |
| 2021/0082118 | A1* | 3/2021 | Zhang ............ G06N 3/084 |
| 2021/0217178 | A1* | 7/2021 | Terzopoulos ......... G06T 7/11 |
| 2021/0248748 | A1* | 8/2021 | Turgutlu ........... G06V 10/764 |
| 2021/0290096 | A1* | 9/2021 | Yang ............ G06F 18/2193 |
| 2021/0295507 | A1* | 9/2021 | Nie ............... G06V 20/695 |
| 2022/0044366 | A1* | 2/2022 | Zhang ............ G06T 3/4046 |
| 2022/0044407 | A1 | 2/2022 | Liu et al. |
| 2022/0108454 | A1* | 4/2022 | Tsai ............... G06T 7/11 |
| 2022/0237799 | A1* | 7/2022 | Price ............... G06T 7/11 |
| 2022/0262009 | A1* | 8/2022 | Yu ............... G06T 7/136 |
| 2022/0292684 | A1* | 9/2022 | Wang ............ G06N 3/084 |
| 2022/0375079 | A1* | 11/2022 | Finley ............ G06V 10/44 |

FOREIGN PATENT DOCUMENTS

| | | |
|---|---|---|
| DE | 102015207047 A1 | 10/2015 |
| WO | WO 2015/177268 A1 | 11/2015 |
| WO | WO 2018/229490 A1 | 12/2018 |

OTHER PUBLICATIONS

U.S. Appl. No. 17/126,986, Aug. 30, 2022, Office Action.

Ali Borji, Ming-Ming Cheng, Qibin Hou, Huaizu Jiang, and Jia Li. Salient object detection: A survey. Computational visual media, pp. 1-34, 2019.

Ali Borji and Laurent Itti. State-of-the-art in visual attention modeling. IEEE transactions on pattern analysis and machine intelligence, 35(1):185-207, 2012.

Liang-Chieh Chen, George Papandreou, Iasonas Kokkinos, Kevin Murphy, and Alan L Yuille. Semantic image segmentation with deep convolutional nets and fully connected crfs. arXiv preprint arXiv:1412.7062, 2014.

Liang-Chieh Chen, Yukun Zhu, George Papandreou, Florian Schroff, and Hartwig Adam. Encoder-decoder with atrous separable convolution for semantic image segmentation. In Proceedings of the European conference on computer vision (ECCV), pp. 801-818, 2018.

Ho Kei Cheng, Jihoon Chung, Yu-Wing Tai, and Chi-Keung Tang. Cascadepsp: Toward class-agnostic and very high-resolution segmentation via global and local refinement. In Proceedings of the IEEE/CVF Conference on Computer Vision and Pattern Recognition, pp. 8890-8899, 2020.

Ming-Ming Cheng, Niloy J Mitra, Xiaolei Huang, Philip H S Torr, and Shi-Min Hu. Global contrast based salient region detection. IEEE transactions on pattern analysis and machine intelligence, 37(3):569-582, 2014.

Kaiming He, Xiangyu Zhang, Shaoqing Ren, and Jian Sun. Deep residual learning for image recognition. In Proceedings of the IEEE conference on computer vision and pattern recognition, pp. 770-778, 2016.

Andrew Howard, Mark Sandler, Grace Chu, Liang-Chieh Chen, Bo Chen, Mingxing Tan, Weijun Wang, Yukun Zhu, Ruoming Pang, Vijay Vasudevan, et al. Searching for mobilenetv3. In Proceedings of the IEEE International Conference on Computer Vision, pp. 1314-1324, 2019.

Gao Huang, Zhuang Liu, Laurens Van Der Maaten, and Kilian Q Weinberger. Densely connected convolutional networks. In Proceedings of the IEEE conference on computer vision and pattern recognition, pp. 4700-4708, 2017.

Laurent Itti, Christof Koch, and Ernst Niebur. A model of saliency-based visual attention for rapid scene analysis. IEEE Transactions on pattern analysis and machine intelligence, 20(11):1254-1259, 1998.

Alexander Kirillov, Yuxin Wu, Kaiming He, and Ross Girshick. Pointrend: Image segmentation as rendering. In Proceedings of the IEEE/CVF Conference on Computer Vision and Pattern Recognition, pp. 9799-9808, 2020.

Dominik A Klein and Simone Frintrop. Center-surround divergence of feature statistics for salient object detection. In 2011 International Conference on Computer Vision, pp. 2214-2219. IEEE, 2011.

Philipp Krahenbuhl and Vladlen Koltun. Efficient inference in fully connected crfs with gaussian edge potentials. In Advances in neural information processing systems, pp. 109-117, 2011.

Alex Krizhevsky, Ilya Sutskever, and Geoffrey E Hinton. Imagenet classification with deep convolutional neural networks. In Advances in neural information processing systems, pp. 1097-1105, 2012.

Guanbin Li and Yizhou Yu. Visual saliency based on multi-scale deep features. In Proceedings of the IEEE conference on computer vision and pattern recognition, pp. 5455-5463, 2015.

(56) References Cited

OTHER PUBLICATIONS

Xiang Li, Tianhan Wei, Yau Pun Chen, Yu-Wing Tai, and Chi-Keung Tang. Fss-1000: A 1000-class dataset for few-shot segmentation. In Proceedings of the IEEE/CVF Conference on Computer Vision and Pattern Recognition, pp. 2869-2878, 2020.
Guosheng Lin, Anton Milan, Chunhua Shen, and Ian Reid. Refinenet: Multi-path refinement networks for high-resolution semantic segmentation. In Proceedings of the IEEE conference on computer vision and pattern recognition, pp. 1925-1934, 2017.
Guosheng Lin, Chunhua Shen, Anton Van Den Hengel, and Ian Reid. Efficient piecewise training of deep structured models for semantic segmentation. In Proceedings of the IEEE conference on computer vision and pattern recognition, pp. 3194-3203, 2016.
Tsung-Yi Lin, Michael Maire, Serge Belongie, James Hays, Pietro Perona, Deva Ramanan, Piotr Dollar, and C Lawrence Zitnick. Microsoft coco: Common objects in context. In European conference on computer vision, pp. 740-755. Springer, 2014.
Nian Liu and Junwei Han. Dhsnet: Deep hierarchical saliency network for salient object detection. In Proceedings of the IEEE Conference on Computer Vision and Pattern Recognition, pp. 678-686, 2016.
Nian Liu, Junwei Han, and Ming-Hsuan Yang. Picanet: Learning pixel-wise contextual attention for saliency detection. In Proceedings of the IEEE Conference on Computer Vision and Pattern Recognition, pp. 3089-3098, 2018.
Jonathan Long, Evan Shelhamer, and Trevor Darrell. Fully convolutional networks for semantic segmentation. In Proceedings of the IEEE conference on computer vision and pattern recognition, pp. 3431-3440, 2015.
Zhiming Luo, Akshaya Mishra, Andrew Achkar, Justin Eichel, Shaozi Li, and Pierre-Marc Jodoin. Non-local deep features for salient object detection. In Proceedings of the IEEE Conference on computer vision and pattern recognition, pp. 6609-6617, 2017.
Robert Osserman et al. The isoperimetric inequality. Bulletin of the American Mathematical Society, 84(6):1182-1238, 1978.
Youwei Pang, Xiaoqi Zhao, Lihe Zhang, and Huchuan Lu. Multi-scale interactive network for salient object detection. In Proceedings of the IEEE/CVF Conference on Computer Vision and Pattern Recognition, pp. 9413-9422, 2020.
Chao Peng, Xiangyu Zhang, Gang Yu, Guiming Luo, and Jian Sun. Large kernel matters-improve semantic segmentation by global convolutional network. In Proceedings of the IEEE conference on computer vision and pattern recognition, pp. 4353-4361, 2017.
Olaf Ronneberger, Philipp Fischer, and Thomas Brox. U-net: Convolutional networks for biomedical image segmentation. In International Conference on Medical image computing and computer-assisted intervention, pp. 234-241. Springer, 2015.
Xiaoyong Shen, Aaron Hertzmann, Jiaya Jia, Sylvain Paris, Brian Price, Eli Shechtman, and Ian Sachs. Automatic portrait segmentation for image stylization. In Computer Graphics Forum, vol. 35, pp. 93-102. Wiley Online Library, 2016.
Jianping Shi, Qiong Yan, Li Xu, and Jiaya Jia. Hierarchical image saliency detection on extended cssd. IEEE transactions on pattern analysis and machine intelligence, 38(4):717729, 2015.
Karen Simonyan and Andrew Zisserman. Very deep convolutional networks for large-scale image recognition. arXiv preprint arXiv:1409.1556, 2014.
Christian Szegedy, Wei Liu, Yangqing Jia, Pierre Sermanet, Scott Reed, Dragomir Anguelov, Dumitru Erhan, Vincent Vanhoucke, and Andrew Rabinovich. Going deeper with convolutions. In Proceedings of the IEEE conference on computer vision and pattern recognition, pp. 1-9, 2015.
Jingdong Wang, Ke Sun, Tianheng Cheng, Borui Jiang, Chaorui Deng, Yang Zhao, Dong Liu, Yadong Mu, Mingkui Tan, Xinggang Wang, et al. Deep high-resolution representation learning for visual recognition. IEEE transactions on pattern analysis and machine intelligence, 2020.
Lijun Wang, Huchuan Lu, Xiang Ruan, and Ming-Hsuan Yang. Deep networks for saliency detection via local estimation and global search. In Proceedings of the IEEE Conference on Computer Vision and Pattern Recognition, pp. 3183-3192, 2015.
Lijun Wang, Huchuan Lu, Yifan Wang, Mengyang Feng, Dong Wang, Baocai Yin, and Xiang Ruan. Learning to detect salient objects with image-level supervision. In Proceedings of the IEEE Conference on Computer Vision and Pattern Recognition, pp. 136-145, 2017.
Linzhao Wang, Lijun Wang, Huchuan Lu, Pingping Zhang, and Xiang Ruan. Saliency detection with recurrent fully convolutional networks. In European conference on computer vision, pp. 825-841. Springer, 2016.
Yichen Wei, Fang Wen, Wangjiang Zhu, and Jian Sun. Geodesic saliency using background priors. In European conference on computer vision, pp. 29-42. Springer, 2012.
Ning Xu, Brian Price, Scott Cohen, and Thomas Huang. Deep image matting. In Proceedings of the IEEE Conference on Computer Vision and Pattern Recognition, pp. 2970-2979, 2017.
Chuan Yang, Lihe Zhang, Huchuan Lu, Xiang Ruan, and Ming-Hsuan Yang. Saliency detection via graph-based manifold ranking. In Proceedings of the IEEE conference on computer vision and pattern recognition, pp. 3166-3173, 2013.
Yi Zeng, Pingping Zhang, Jianming Zhang, Zhe Lin, and Huchuan Lu. Towards high-resolution salient object detection. In Proceedings of the IEEE International Conference on Computer Vision, pp. 7234-7243, 2019.
Chi Zhang, Guosheng Lin, Fayao Liu, Rui Yao, and Chunhua Shen. Canet: Class-agnostic segmentation networks with iterative refinement and attentive few-shot learning. In Proceedings of the IEEE Conference on Computer Vision and Pattern Recognition, pp. 5217-5226, 2019.
Jianming Zhang and Stan Sclaroff. Saliency detection: A boolean map approach. In Proceedings of the IEEE international conference on computer vision, pp. 153-160, 2013.
Lihe Zhang, Jianwu Ai, Bowen Jiang, Huchuan Lu, and Xiukui Li. Saliency detection via absorbing markov chain with learnt transition probability. IEEE Transactions on Image Processing, 27(2):987-998, 2017.
Lu Zhang, Ju Dai, Huchuan Lu, You He, and Gang Wang. A bi-directional message passing model for salient object detection. In Proceedings of the IEEE Conference on Computer Vision and Pattern Recognition, pp. 1741-1750, 2018.
Lihe Zhang, Chuan Yang, Huchuan Lu, Xiang Ruan, and Ming-Hsuan Yang. Ranking saliency. IEEE transactions on pattern analysis and machine intelligence, 39(9):1892-1904, 2016.
Pingping Zhang, Dong Wang, Huchuan Lu, Hongyu Wang, and Xiang Ruan. Amulet: Aggregating multi-level convolutional features for salient object detection. In Proceedings of the IEEE International Conference on Computer Vision, pp. 202-211, 2017.
Xiaoning Zhang, Tiantian Wang, Jinqing Qi, Huchuan Lu, and Gang Wang. Progressive attention guided recurrent network for salient object detection. In Proceedings of the IEEE Conference on Computer Vision and Pattern Recognition, pp. 714-722, 2018.
Hengshuang Zhao, Jianping Shi, Xiaojuan Qi, Xiaogang Wang, and Jiaya Jia. Pyramid scene parsing network. In Proceedings of the IEEE conference on computer vision and pattern recognition, pp. 2881-2890, 2017.
Jia-Xing Zhao, Jiang-Jiang Liu, Deng-Ping Fan, Yang Cao, Jufeng Yang, and Ming-Ming Cheng. Egnet: Edge guidance network for salient object detection. In Proceedings of the IEEE International Conference on Computer Vision, pp. 8779-8788, 2019.
Rui Zhao, Wanli Ouyang, Hongsheng Li, and Xiaogang Wang. Saliency detection by multi-context deep learning. In Proceedings of the IEEE conference on computer vision and pattern recognition, pp. 1265-1274, 2015.
Shuai Zheng, Sadeep Jayasumana, Bernardino Romera-Paredes, Vibhav Vineet, Zhizhong Su, Dalong Du, Chang Huang, and Philip HS Ton. Conditional random fields as recurrent neural networks. In Proceedings of the IEEE international conference on computer vision, pp. 1529-1537, 2015.
Wangjiang Zhu, Shuang Liang, Yichen Wei, and Jian Sun. Saliency optimization from robust background detection. In Proceedings of the IEEE conference on computer vision and pattern recognition, pp. 2814-2821, 2014.
X. Bai and G. Sapiro. Geodesic matting: a framework for fast interactive image and video segmentation and matting. International Journal of Computer Vision, 82(2):113-132, 2008.

(56) References Cited

OTHER PUBLICATIONS

Y. Y. Boykov and M.-P. Jolly. Interactive graph cuts for optimal, boundary & region segmentation of objects in n-d images. In Computer Vision, 2001. ICCV 2001. Proceedings. Eighth IEEE International Conference on, vol. 1, pp. 105-112. IEEE, 2001.
L.-C. Chen, G. Papandreou, I. Kokkinos, K. Murphy, and A. L. Yuille. Semantic image segmentation with deep convolutional nets and fully connected crfs. arXiv preprint arXiv:1412.7062, 2014.
R. Girshick, J. Donahue, T. Darrell, and J. Malik. Rich feature hierarchies for accurate object detection and semantic segmentation. In Computer Vision and Pattern Recognition (CVPR), 2014 IEEE Conference on, pp. 580-587. IEEE, 2014.
L. Grady. Random walks for image segmentation. Pattern Analysis and Machine Intelligence, IEEE Transactions on, 28(11):1768-1783, 2006. Part 1.
L. Grady. Random walks for image segmentation. Pattern Analysis and Machine Intelligence, IEEE Transactions on, 28(11):1768-1783, 2006. Part 2.
V. Gulshan, C. Rother, A. Criminisi, A. Blake, and A. Zisserman. Geodesic star convexity for interactive image segmentation. In Computer Vision and Pattern Recognition (CVPR), 2010 IEEE Conference on, pp. 3129-3136. IEEE, 2010.
G. Lin, C. Shen, I. Reid, et al. Efficient piecewise training of deep structured models for semantic segmentation. arXiv preprint arXiv:1504.01013, 2015.
Z. Liu, X. Li, P. Luo, C. C. Loy, and X. Tang. Semantic image segmentation via deep parsing network. arXiv preprint arXiv:1509.02634, 2015.
J. Long, E. Shelhamer, and T. Darrell. Fully convolutional networks for semantic segmentation. arXiv preprint arXiv:1411.4038, 2014.
B. L. Price, B. Morse, and S. Cohen. Geodesic graph cut for interactive image segmentation. In Computer Vision and Pattern Recognition (CVPR), 2010 IEEE Conference on, pp. 3161-3168. IEEE, 2010.
C. Rother, V. Kolmogorov, and A. Blake. Grabcut: Interactive foreground extraction using iterated graph cuts. ACM Transactions on Graphics (TOG), 23(3):309-314, 2004.
S. Zheng, S. Jayasumana, B. Romera-Paredes, V. Vineet, Z. Su, D. Du, C. Huang, and P. Torr. Conditional random fields as recurrent neural networks. arXiv preprint arXiv:1502.03240, 2015.
Roth, H.—"DeepOrgan: Multi-level Deep Convolutional Networks for Automated Pancreas Segmentation"—Jun. 22, 2015—arXiv:1506.06448v1, pp. 1-12.
Wang, N.—"Transferring Rich Feature Hierarchies for Robust Visual Tracking"—Apr. 23, 2015—arXiv:1501.04587v2, pp. 1-9.
Farag, A.—"A Bottom-up Approach for Pancreas Segmentation using Cascaded Superpixels and (Deep) Image Patch Labeling"—May 22, 2015—Elsevier Journal of Medical Image Analysis, pp. 1-21.
D. Acuna, H. Ling, A. Kar, and S. Fidler. Efficient interactive annotation of segmentation datasets with Polygon-RNN++. In CVPR, 2018.
D. Batra, P. Yadollahpour, A. Guzman-Rivera, and G. Shakhnarovich. Diverse m-best solutions in markov random fields. In ECCV, 2012.
L. Castrejon, K. Kundu, R. Urtasun, and S. Fidler. Annotating object instances with a polygon-rnn. In IEEE CVPR, Jul. 2017.
L.-C. Chen, Y. Zhu, G. Papandreou, F. Schroff, and H. Adam. Encoder-decoder with atrous separable convolution for semantic image segmentation. arXiv preprint arXiv:1802.02611, 2018.
A. Criminisi, T. Sharp, and A. Blake. GeoS: Geodesic image segmentation. In ECCV, pp. 99-112, 2008.
M. Everingham, L. Van Gool, C. K. Williams, J. Winn, and A. Zisserman. The pascal visual object classes (VOC) challenge. IJCV, 88(2):303-338, 2010.
M. Firman, N. D. F. Campbell, L. Agapito, and G. J. Brostow. Diversenet: When one right answer is not enough. In IEEE CVPR, Jun. 2018.
D. Freedman and T. Zhang. Interactive graph cut based segmentation with shape priors. In IEEE CVPR, vol. 1, pp. 755-762. IEEE, 2005.
A. Guzman-rivera, D. Batra, and P. Kohli. Multiple choice learning: Learning to produce multiple structured outputs. In F. Pereira, C. J. C. Burges, L. Bottou, and K. Q. Weinberger, editors, NIPS, pp. 1799-1807. 2012.
B. Hariharan, P. Arbelaez, L. Bourdev, S. Maji, and J. Malik. Semantic contours from inverse detectors. 2011.
K. He, X. Zhang, S. Ren, and J. Sun. Deep residual learning for image recognition. In IEEE CVPR, Jun. 2016.
Y. Hu, A. Soltoggio, R. Lock, and S. Carter. A fully convolutional two-stream fusion network for interactive image segmentation. Neural Networks, 109:31-42, 2019.
M. Kass, A. Witkin, and D. Terzopoulos. Snakes: Active contour models. IJCV, 1(4):321-331, 1988.
H. Le, L. Mai, B. Price, S. Cohen, H. Jin, and F. Liu. Interactive boundary prediction for object selection. In ECCV, Sep. 2018.
S. Lee, S. Purushwalkam Shiva Prakash, M. Cogswell, D. Crandall, and D. Batra. Why M heads are better than one: Training a diverse ensemble of deep networks. CoRR, abs/1511.06314, 2015.
S. Lee, S. Purushwalkam Shiva Prakash, M. Cogswell, V. Ranjan, D. Crandall, and D. Batra. Stochastic multiple choice learning for training diverse deep ensembles. In D. D. Lee, M. Sugiyama, U. V. Luxburg, I. Guyon, and R. Garnett, editors, NIPS, pp. 2119-2127. 2016.
Y. Li, J. Sun, C.-K. Tang, and H.-Y. Shum. Lazy snapping. In ACM Transactions on Graphics, vol. 23, pp. 303-308, 2004.
Z. Li, Q. Chen, and V. Koltun. Interactive image segmentation with latent diversity. In IEEE CVPR, pp. 577-585, 2018.
J. H. Liew, Y. Wei, W. Xiong, S.-H. Ong, and J. Feng. Regional interactive image segmentation networks. In IEEE ICCV, Oct. 2017.
S. Mahadevan, P. Voigtlaender, and B. Leibe. Iteratively trained interactive segmentation. arXiv preprint arXiv:1805.04398, 2018.
K. Maninis, S. Caelles, J. Pont-Tuset, and L. Van Gool. Deep extreme cut: From extreme points to object segmentation. In IEEE CVPR, 2018.
K. McGuinness and N. E. OConnor. Toward automated evaluation of interactive segmentation. Computer Vision and Image Understanding, 115(6):868-884, 2011.
E. N. Mortensen and W. A. Barrett. Intelligent scissors for image composition. In Proceedings of the 22nd annual conference on Computer graphics and interactive techniques, pp. 191-198, 1995.
J. Redmon, S. Divvala, R. Girshick, and A. Farhadi. You only look once: Unified, real-time object detection. In Proceedings of the IEEE conference on computer vision and pattern recognition, pp. 779-788, 2016.
S. Ren, K. He, R. Girshick, and J. Sun. Faster r-cnn: Towards real-time object detection with region proposal networks. In Advances in neural information processing systems, pp. 91-99, 2015.
O. Russakovsky, J. Deng, H. Su, J. Krause, S. Satheesh, S. Ma, Z. Huang, A. Karpathy, A. Khosla, M. Bernstein, et al. Imagenet large scale visual recognition challenge. IJCV, 115(3):211-252, 2015.
S. Vicente, V. Kolmogorov, and C. Rother. Graph cut based image segmentation with connectivity priors. In IEEE CVPR, pp. 1-8. IEEE, 2008.
N. Xu, B. Price, S. Cohen, J. Yang, and T. S. Huang. Deep interactive object selection. In IEEE CVPR, pp. 373-381, Mar. 13, 2016.
K. Yamaguchi, M. H. Kiapour, L. E. Ortiz, and T. L. Berg. Parsing clothing in fashion photographs. In Computer Vision and Pattern Recognition (CVPR), 2012 IEEE Conference on, pp. 3570-3577. IEEE, 2012.
B. Zhou, H. Zhao, X. Puig, S. Fidler, A. Barriuso, and A. Torralba. Scene parsing through ade20k dataset. In Proceedings of the IEEE Conference on Computer Vision and Pattern Recognition, 2017.
Tsung-Yi Lin, Michael Maire, Serge Belongie, Lubomir Bourdev, Ross Girshick, James Hays, Pietro Perona, Deva Ramanan, C. Lawrence Zitnick, Piotr Dollár; "Microsoft COCO: Common Objects in Context," Submitted on May 1, 2014 (v1), last revised Feb. 21, 2015 (this version, v3), Cornell University Library, arXiv:1405.0312v3 [cs.CV], 15 pages.
Gao Huang, Zhuang Liu, Kilian Q. Weinberger, and Laurens V.D. Maaten; "Densely connected convolutional networks," In arXiv:1608.06993v3, 2016.

(56) References Cited

OTHER PUBLICATIONS

C. Szegedy, W. Liu, Y.Q. Jia, P. Sermanet, S. Reed, D. Anguelov, D. Erhan, V. Vanhoucke, and A. Rabinovich; "Going deeper with convolutions," In CVPR , 2015.
Chen et al, 'DISC: Deep Image Saliency Computing via Progressive Representation Learning', 2016, IEEE Transactions on Neural Networks and Learning Systems, vol. 27, No. 6, pp. 1135-1149 (Year: 2016).
Kamat, S. P.; Control Theory and Informatics, vol. 2, No. 1, 2012 Digital Image Processing for Camera Application in Mobile Devices using Artificial Neural Networks, pp. 11-17.
IEEE Conference on Computer Vision and Pattern Recognition (CVPR), 2016, Liang Chieh Chen et al, "Attention to Scale: Scale-Aware Semantic Image Segmentation", pp. 3640-3649 abstract 1. 7-9 and p. 2 left column, 1st paragraph starting at "In particular . . . ", 1. 4-7, Sec. 3.1, Fig. 5 column (c).
IEEE/CVF International Conference on Computer Vision (ICCV), 2019, Liew Jun Hao et al, "MultiSeg: Semantically Meaningful, Scale-Diverse Segmentations From Minimal User Input", pp. 662-670 the whole document.
Chen, Liang-Chieh et al. "Rethinking Atrous Convolution for Semantic Image. Segmentation." ArXiv abs/1706.05587 (2017): n. pag.
M. Rajchl et al., "DeepCut: Object Segmentation From Bounding Box Annotations Using Convolutional Neural Networks," in IEEE Transactions on Medical Imaging, vol. 36, No. 2, pp. 674-683, Feb. 2017, archived at arxiv.org/pdf/1605.07866.
Combined Search and Examination Report as received in UK application GB1915436.8 dated Aug. 12, 2020.
Combined Search & Examination Report as received in UK application GB1813276.1 dated Feb. 14, 2019.
Intention to Grant as received in UK application GB1915436.8 dated Aug. 25, 2021.
Zhang et al. in U.S. Appl. No. 16/988,055, filed Aug. 7, 2020, entitled Generating an Image Mask for a Digital Image by Utilizing a Multi-Branch Masking Pipeline With Neural Networks.
Li et al., Interactive Image Segmentation with Latent Diversity, 2018, IEEE 2575-7075/18, DOI 10.11/09/CVPR. 2018.00067, pp. 577-585. (Year: 2018).
Xu et al., Deep Interactive Object Selection, Mar. 13, 2016 arXiv:1603.04042v1 [cs.CV], pp. 1-9. (Year: 2016).
Guo, Z.—"Deep Learning-Based Image Segmentation on Multimodal Medical Imaging"—IEEE—Mar. 1, 2019—pp. 162-169 ( Year: 2019).
Wang, G.—"Interactive Medical Image Segmentation using Deep Learning with Image-specific Fine-tuning"—arXiv—Oct. 11, 2017—pp. 1-11 (Year: 2017).
Guo, Z.—"Medical Image Segmentation Based on Multi-Modal Convolutional Neural Network: Study on Image Fusion Schemes"—arXiv—Nov. 2, 2017—pp. 1-10 (Year: 2017).
Examination Report as received in Australian application 2019250107 dated Oct. 14, 2021.
Examination Report as received in Australian application 2019250107 dated Nov. 5, 2021.
Notice of Grant as received in UK application GB1813276.1 dated Oct. 12, 2021.
Notice of Grant as received in Australian application 2019250107 dated Mar. 17, 2022.
U.S. Appl. No. 14/945,245, Sep. 21, 2017, Preinterview 1st Office Action.
U.S. Appl. No. 14/945,245, Nov. 1, 2017, 1st Action Office Action.
U.S. Appl. No. 14/945,245, Apr. 17, 2018, Office Action.
U.S. Appl. No. 14/945,245, Sep. 12, 2018, Notice of Allowance.
U.S. Appl. No. 16/216,739, Feb. 25, 2021, Preinterview 1st Office Action.
U.S. Appl. No. 16/216,739 Apr. 5, 2021, 1st Action Office Action.
U.S. Appl. No. 16/216,739, Sep. 13, 2021, Office Action.
U.S. Appl. No. 16/216,739, Dec. 23, 2021, Notice of Allowance.
U.S. Appl. No. 15/799,395, Mar. 14, 2019, Office Action.
U.S. Appl. No. 15/799,395, Jul. 12, 2019, Notice of Allowance.
U.S. Appl. No. 15/967,928, Dec. 10, 2020, Preinterview 1st Office Action.
U.S. Appl. No. 15/967,928, Apr. 2, 2021, 1st Action Office Action.
U.S. Appl. No. 15/967,928, May 13, 2021, Office Action.
U.S. Appl. No. 15/967,928, Sep. 29, 2021, Notice of Allowance.
U.S. Appl. No. 16/231,746, Feb. 18, 2021, Preinterview 1st Office Action.
U.S. Appl. No. 16/231,746, Jun. 11, 2021, 1st Action Office Action.
U.S. Appl. No. 16/231,746, Nov. 10, 2021, Notice of Allowance.
U.S. Appl. No. 16/988,408, Oct. 5, 2021, Preinterview 1st Office Action.
U.S. Appl. No. 16/988,408, Nov. 24, 2021, 1st Action Office Action.
U.S. Appl. No. 16/988,408, Jan. 5, 2022, Notice of Allowance.
U.S. Appl. No. 16/376,704, Dec. 29, 2021, Preinterview 1st Office Action.
U.S. Appl. No. 16/376,704, Feb. 7, 2022, 1st Action Office Action.
Shuai Zheng, Sadeep Jayasumana, Bernardino Romera-Paredes, Vibhav Vineet, Zhizhong Su, Dalong Du, Chang Huang, and Philip HS Torr. Conditional random fields as recurrent neural networks. In Proceedings of the IEEE international conference on computer vision, pp. 1529-1537, 2015.
U.S. Appl. No. 16/376,704, Oct. 4, 2022, Notice of Allowance.
Wang, Y., Zhao, X., Li, Y., & Huang, K. (2018). Deep crisp boundaries: From boundaries to higher-level tasks. IEEE Transactions on Image Processing, 28(3), 1285-1298. (Year: 2018).
Le, T., & Duan, Y. (2020). REDN: a recursive encoder-decoder network for edge detection. IEEE Access, 8, 90153-90164. (Year: 2020).
Zhao, H., Shi, J., Qi, X., Wang, X., & Jia, J. (2017). Pyramid scene parsing network. In Proceedings of the IEEE conference on computer vision and pattern recognition (pp. 2881-2890). (Year: 2017).
Cheng, Ho & Chung, Jihoon & Tai, Yu-Wing & Tang, Chi-Keung. (2020). CascadePSP: Toward Class-Agnostic and Very High-Resolution Segmentation via Global and Local Refinement. arXiv:2005.02551v1 [cs.CV] May 6, 2020.
U.S. Appl. No. 17/126,986, Jan. 17, 2023, Notice of Allowance.
U.S. Appl. No. 17/200,525, Mar. 6, 2023, Office Action.
Office Action as received in CN application 201810886944.1 dated Apr. 8, 2023.

* cited by examiner

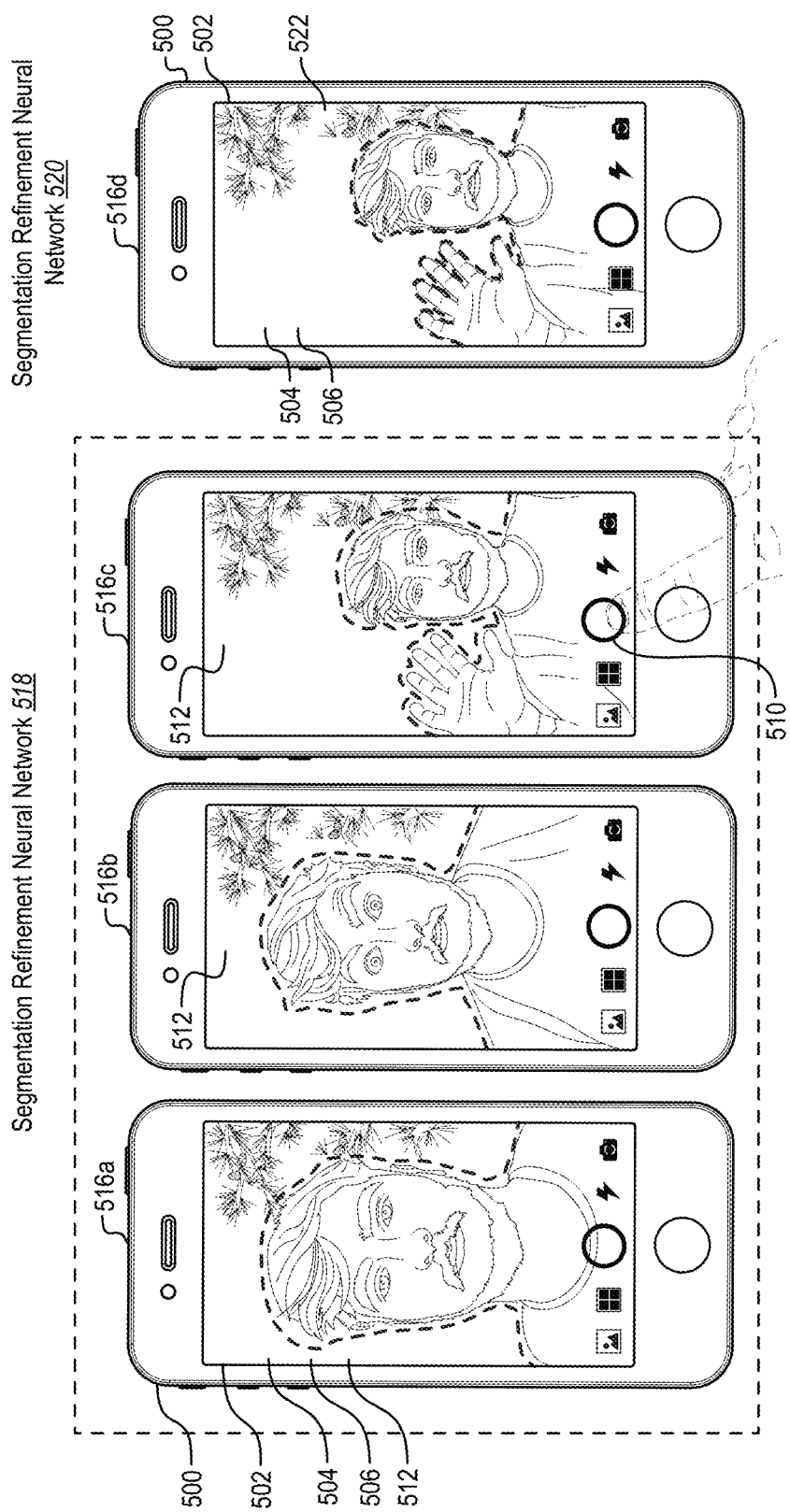

|  | COCO-person | Flickr-hp | Flickr-portrait | MSRA10K | DUT |
|---|---|---|---|---|---|
| Deeplabv3+ | 0.912 | 0.933 | 0.968 | 0.899 | 0.868 |
| Our model | 0.909 | 0.93 | 0.965 | 0.893 | 0.865 |
| GoogleNet | 0.89 | 0.919 | 0.961 | 0.875 | 0.832 |

*Fig. 7A*

|  | COCO-person | Flickr-hp | Flickr-portrait | MSRA10K | DUT |
|---|---|---|---|---|---|
| Deeplabv3+ | 0.349 | 0.341 | 0.343 | 0.302 | 0.29 |
| Our model | 0.352 | 0.356 | 0.375 | 0.31 | 0.318 |
| GoogleNet | 0.284 | 0.244 | 0.239 | 0.202 | 0.164 |

*Fig. 7B*

| size | GoogleNet | Deeplabv3+ | Our model |
|---|---|---|---|
| | 39.8M | 90.6M | 18.8M |

Fig. 8

ITERATIVELY REFINING SEGMENTATION MASKS

CROSS-REFERENCE TO RELATED APPLICATIONS

This application is a continuation of U.S. patent application Ser. No. 16/988,408, filed on Aug. 7, 2020. The aforementioned application is hereby incorporated by reference in its entirety.

BACKGROUND

Recent years have seen a significant advancement in hardware and software platforms that perform various tasks for editing digital visual media items (e.g., digital photos, digital videos, digital video feeds). For example, many conventional systems generate a segmentation mask to distinguish between various portions of a digital visual media item (e.g., distinguish a displayed object from the background). The conventional systems then apply various filters or effects to a desired portion of the digital visual media item based on the generated segmentation mask. More recent advancements have even enabled deployment of such conventional systems on mobile computing devices, such as laptops, tablets, or smartphones. Indeed, individuals and businesses increasingly utilize laptops, tablets, smartphones, handheld devices, and other mobile technology for a variety of tasks involving digital visual media. For example, individuals and businesses increasingly utilize smartphones to capture, view, and modify digital visual media such as portrait images, "selfies," or digital videos.

Despite these advantages, however, conventional segmentation systems suffer from several technological shortcomings that result in inefficient and inaccurate operation. Although conventional digital visual media systems allow users to capture and modify digital visual media, they also have a number of significant shortcomings. For example, conventional digital visual media systems can utilize cameras to capture digital visual media, but cannot easily, quickly, or efficiently select or segregate individual objects from other pixels portrayed in the digital visual media.

Furthermore, many conventional systems employ large models that require a significant amount of computing resources (e.g., memory, processing power, and processing time) for generating segmentation masks. Though some conventional systems utilize smaller models that are deployable on mobile computing devices, these models still consume a considerable portion of the limited resources of these devices and may contribute to latency issues when generating segmentation masks. Further, many conventional systems utilize models that generate segmentation masks using pixel-wise classification—these models are computationally demanding.

In addition to efficiency concerns, conventional segmentation systems can also operate inaccurately. Indeed, many conventional systems generate segmentation masks that inaccurately identify those pixels that correspond to an object and those pixels that do not. For example, conventional systems often generate segmentation masks that have boundary errors or missing boundary details in regions where the prediction confidence is low. This is especially true for those conventional systems operating on mobile computing devices where the size of the model is restricted to meet the constraints of limited computational resources.

These, along with additional problems and issues, exist with regard to conventional segmentation systems.

SUMMARY

One or more embodiments described herein provide benefits and/or solve one or more problems in the art with systems, methods, and non-transitory computer-readable media that efficiently generate high-quality segmentation masks by progressively refining uncertain pixels. For example, in one or more embodiments, a system utilizes a neural network to iteratively refine a segmentation mask for an input digital visual media item (e.g., image or video frame). In some embodiments, for each iteration, the system utilizes the neural network to identify uncertain pixels (e.g., pixels that have been uncertainly classified) from a previously-generated segmentation mask and reclassifies at least some of the uncertain pixels. Thus, the system focuses the neural network on the identified uncertain pixels when refining the segmentation mask. In this manner, the system allows for a smaller neural network architecture—such as one that can be efficiently deployed on mobile computing devices—that refines local details to improve the accuracy of the segmentation mask.

Additional features and advantages of one or more embodiments of the present disclosure are outlined in the description which follows, and in part will be obvious from the description, or may be learned by the practice of such example embodiments.

BRIEF DESCRIPTION OF THE DRAWINGS

This disclosure will describe one or more embodiments of the invention with additional specificity and detail by referencing the accompanying figures. The following paragraphs briefly describe those figures, in which:

FIGS. 5A-5D illustrate a user interface used by the segmentation refinement system for displaying a modified digital visual media item in accordance with one or more embodiments;

FIGS. 7A-7B illustrate tables reflecting additional experimental results regarding the effectiveness of the segmentation refinement system in accordance with one or more embodiments;

FIG. 8 illustrates a table reflecting the size of the segmentation refinement system in accordance with one or more embodiments;

DETAILED DESCRIPTION

Figure 1:
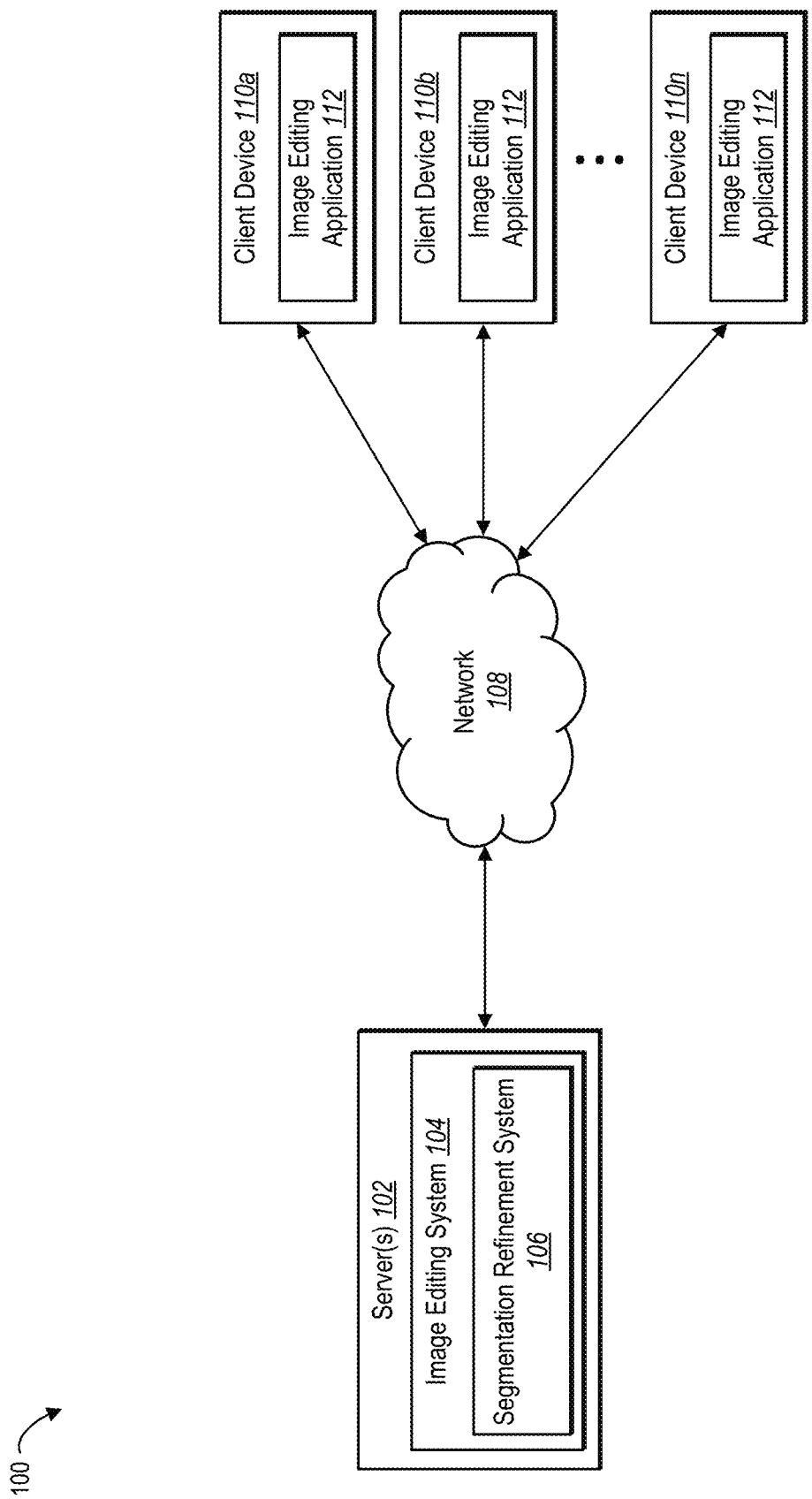
FIG. 1 illustrates an example environment in which a segmentation refinement system operates in accordance with one or more embodiments.

One or more embodiments described herein include a segmentation refinement system that iteratively refines the classification of pixels of digital visual media items to efficiently and accurately generate corresponding segmentation masks. To illustrate, in one or more embodiments, the segmentation refinement system utilizes a neural network to generate a segmentation mask for a digital visual media item (e.g., a digital photo, a digital video frame). The segmentation refinement system further utilizes the neural network to identify uncertain pixels within the segmentation mask (e.g., pixels that have been uncertainly classified as belonging or not belonging to a foreground portrayed in the digital visual media item). The neural network iteratively refines the segmentation mask using low-level features that correspond to the identified uncertain pixels. For example, in some instances, the neural network refines the segmentation mask by redetermining whether or not at least some of the uncertain pixels correspond to a foreground portrayed in the digital visual media item, or not, based the low-level features corresponding to those uncertain pixels.

To provide an illustration, in one or more embodiments, the segmentation refinement system identifies a digital visual media item that comprises a plurality of pixels and depicts one or more objects. Further, the segmentation refinement system utilizes a segmentation refinement neural network to generate an initial segmentation mask for the digital visual media item by determining whether the plurality of pixels correspond to the one or more objects. Additionally, the segmentation refinement system utilizes the segmentation refinement neural network to determine, based on the initial segmentation mask, uncertain pixels, the uncertain pixels having an associated uncertainty that the uncertain pixels correspond to the one or more objects or do not correspond to the one or more objects. Using the segmentation refinement neural network, the segmentation refinement system further generates a refined segmentation mask for the digital visual media item by redetermining whether a set of uncertain pixels correspond to the one or more objects.

As just mentioned, in one or more embodiments, the segmentation refinement system utilizes a segmentation refinement neural network to generate an initial segmentation mask for a digital visual media item. For example, in some embodiments, the segmentation refinement neural network includes a backbone neural network component, such as a convolutional neural network, that generates initial segmentation masks for digital visual media items.

In one or more embodiments, the segmentation refinement neural network generates the initial segmentation mask by generating one or more initial feature maps by extracting deep or latent features from the digital visual media item. The segmentation refinement neural network further generates a final feature map based on the one or more initial feature maps. Further, the segmentation refinement neural network generates the initial segmentation mask based on the final feature map. In particular, in some embodiments, the segmentation refinement neural network generates the initial segmentation mask by determining (e.g., predicting) whether the pixels of the digital visual media item belong to one or more objects depicted by the digital visual media item. In some instances, the segmentation refinement neural network generates the initial segmentation mask to have a lower resolution than the digital visual media item.

Additionally, as mentioned above, in one or more embodiments, the segmentation refinement system further utilizes the segmentation refinement neural network to generate a refined segmentation mask for a digital visual media item. For instance, the segmentation refinement system utilizes the segmentation refinement neural network to generate the refined segmentation mask based on the initial segmentation mask. In particular, in some embodiments, the segmentation refinement neural network includes a refinement neural network component, such as a multi-layer perceptron renderer, that generates refined segmentation masks based on initial segmentation masks.

To illustrate, in one or more embodiments, the segmentation refinement neural network generates a refined segmentation mask for a digital visual media item by determining or identifying uncertain pixels of the initial segmentation mask. For instance, the segmentation refinement neural network identifies uncertain pixels that have an associated uncertainty that the uncertain pixels have been classified correctly within the initial segmentation mask. More specifically, in some embodiments, the segmentation refinement neural network generates an uncertainty map that provides uncertainty scores for the pixels of the initial segmentation mask. In some instances, the segmentation refinement neural network utilizes one or more neural network layers having learned network weights to generate the uncertainty map based on the initial segmentation mask and the final feature map. In some instances, the uncertainty map further identifies certain pixels that have an associated certainty that the certain pixels have been classified correctly within the initial segmentation mask.

Additionally, in one or more embodiments, the segmentation refinement neural network generates the refined segmentation mask for the digital visual media item by extracting feature values associated with uncertain pixels and certain pixels of the initial segmentation mask (e.g., as identified by the uncertainty map). For example, in some embodiments, the segmentation refinement neural network extracts feature values associated with uncertain pixels from the one or more initial feature maps and the final feature map corresponding to the digital visual media item. In some instances, the segmentation refinement neural network further extracts feature values associated with certain pixels from the final feature map. Based on the extracted feature values, the segmentation refinement neural network generates the refined segmentation mask by redetermining whether a set of the uncertain pixels correspond to the one or more objects depicted in the digital visual media item.

In one or more embodiments, the segmentation refinement neural network generates multiple refined segmentation masks for a digital visual media item via multiple refinement iterations. Indeed, in some embodiments, the segmentation refinement neural network determines or identifies uncertain pixels from the refined segmentation mask and generates an additional refined segmentation mask accordingly. Thus, the segmentation refinement neural network can utilize the segmentation refinement neural network to iteratively improve the quality of the segmentation mask.

Further, in one or more embodiments, the segmentation refinement system can modify the digital visual media item using the refined segmentation mask. For example, in some implementations, the segmentation refinement system applies a filter or an effect to the digital visual media item. To illustrate, in some embodiments, the segmentation refinement system uses refined segmentation masks to modify the video frames of a digital video feed in real-time, allowing for stability across the video frames.

The segmentation refinement system provides several advantages over conventional systems. For example, the segmentation refinement system operates more efficiently than conventional systems. Indeed, the segmentation refinement neural network is smaller than those models typically employed by conventional systems, allowing for a reduced usage of computing resources when generating segmentation masks. Accordingly, the segmentation refinement system operates more efficiently, even on mobile computing devices that are limited in their capacities. In particular, by focusing the segmentation refinement neural network on analyzing the local details of uncertain pixels when refining segmentation masks, the segmentation refinement system reduces the computational load required to implement and train the segmentation refinement neural network.

Indeed, as a result of this improved computational efficiency, the segmentation refinement system can also be deployed more flexibly on a variety of computing devices. For instance, as mentioned above, the segmentation refinement system can apply one or more neural networks directly on a mobile device with limited memory and processing power (such as a smartphone or tablet). Thus, although conventional systems often require high-powered servers or other computing devices to operate, the segmentation refinement system can allow mobile devices to identify and segment objects portrayed in digital images, digital video, or live camera streams.

Additionally, the segmentation refinement system improves accuracy. Specifically, the segmentation refinement system operates more accurately than other conventional systems designed to operate on smaller, mobile computing devices. Indeed, by employing a segmentation refinement neural network the iteratively refines the classification of uncertain pixels, the segmentation refinement system generates more accurate segmentation masks. In one or more embodiments, the segmentation refinement system further adjusts the number of refinement iterations performed by the segmentation refinement neural network to better accommodate the available resources of the implementing computing device or to improve the accuracy of the refined segmentation masks.

Furthermore, in one or more embodiments, the segmentation refinement system utilizes neural network layers to determine or identify the uncertain pixels rather than using a heuristic baseline value. Indeed, the segmentation refinement system can learn the uncertain pixels from the prediction error. This date-dependent captures more local details and learns to select pixels as uncertain that will increase segmentation quality. As the refinement quality depends on the accuracy of identifying uncertain pixels, utilizing machine learning to identify the uncertain pixels leads to increase segmentation accuracy.

In addition to the foregoing, the segmentation refinement system allows for stable frames (e.g., stable segmentation of frames) of video streams. In particular, by progressively refining the classification of uncertain pixels, rather than using a larger neural network with increased latency, the segmentation mask is stable across frames of video streams. Thus, one or more embodiments, allow for accurate and stable live segmentation of video streams on mobile computing devices, like smart phones, without latency.

As illustrated by the foregoing discussion, the present disclosure utilizes a variety of terms to describe features and benefits of the segmentation refinement system. Additional detail is now provided regarding the meaning of these terms. For example, as used herein, the term "digital visual media item" refers to any digital item capable of producing a visual representation. For instance, in one or more embodiments, a digital visual item refers to a previously-captured digital item, such as a previously-captured digital image (e.g., a digital photo or other digitally-created image) or digital video. In some embodiments, a digital visual media item refers to a digital video or other camera feed. Further, in some instances, a digital video media item refers to a video frame of a previously-captured digital video or a video frame of a digital video feed.

As used herein, the term "digital video feed" refers to a live feed of digital camera. For instance, a digital video feed refers to a live presentation of digital video as the digital video is captured in real-time by a digital camera. For example, a digital video feed includes a live feed of digital video that is received by a computing device from another computing device that is capturing the live feed of digital video. In some embodiments, a digital video feed includes a live feed of digital video captured (and displayed) by a single computing device, such as a mobile computing device (e.g., a smartphone) having an integrated camera. In one or more embodiments, a digital video feed includes one or more video frames. As used herein, the term "video frame" refers to a single frame of a digital video feed. In some embodiments, a video frame includes a single frame of a previously-captured digital video.

In one or more embodiments, a digital visual media item depicts one or more objects. As used herein, the term "object" refers to a distinguishable element depicted in a digital visual media item. For example, in some embodiments, an object includes a person, an item, a natural object (e.g., a tree or rock formation) or a structure depicted in a digital visual media item. In some instances, an object includes a plurality of elements that, collectively, can be distinguished from other elements depicted in a digital visual media item. For example, in some instances, an object includes a collection of building that make up a skyline. In some instances, an object refers more broadly to a foreground depicted in a digital visual media item as distinguished from a background.

Additionally, as used herein, the term "neural network" refers to a machine learning model that can be tuned (e.g., trained) based on inputs to approximate unknown functions used for generating the corresponding outputs. Indeed, in some embodiments, a neural network includes a model of interconnected artificial neurons (e.g., organized in layers) that communicate and learn to approximate complex functions and generate outputs based on a plurality of inputs provided to the model. In some instances, a neural network includes one or more machine learning algorithms. Further, a neural network includes an algorithm (or set of algorithms) that implements deep learning techniques that utilize a set of algorithms to model high-level abstractions in data. To illustrate, in some embodiments, a neural network includes a convolutional neural network, a recurrent neural network (e.g., a long short-term memory neural network), a generative adversarial neural network, a graph neural network, or a multi-layer perceptron. In some embodiments, a neural network includes a combination of neural networks or neural network components.

As just mentioned, in some embodiments, a neural network includes interconnected artificial neurons organized into layers. As used herein, the term "neural network layer" refers to a collection of one or more artificial neurons at a particular depth of a neural network. For example, in some instances, a neural network layer includes a collection of artificial neurons that processes an input to the neural network layer, which includes an input to the neural network or an output of a previous neural network layer.

In some embodiments, a neural network layer processes an input using one or more learned network weights. As used herein, the term "learned network weight" refers to a parameter of a neural network. In some embodiments, a learned network weight refers to a parameter that is learned by the neural network during training of the neural network. For instance, each neuron (i.e., channel) can compute an output value by applying a function to values provided as inputs, where the function is determined by a vector of learned network weights. Through training (e.g., backpropagation), the neural network can tune and learn optimal network weights.

As used herein, the term "segmentation refinement neural network" refers to a computer-implemented neural network that generates refined segmentation masks for digital visual media items. Indeed, in some embodiments, a segmentation refinement neural network refers to a neural network that analyzes a digital visual media item, generates an initial segmentation mask for the digital visual media item, and generates one or more refined segmentation masks based on the initial segmentation mask. For example, in one or more embodiments, a segmentation refinement neural network includes a neural network composed of a convolutional neural network and a multi-layer perceptron renderer. As used herein, the term "multi-layer perceptron renderer" refers to a feedforward neural network. For example, in some embodiments, a multi-layer perceptron renderer includes a feedforward neural network that generates one or more refined segmentation masks for a digital visual media item based on an initial segmentation mask corresponding to the digital visual media item.

Additionally, as used herein, the term "segmentation mask" refers to an identification of pixels in a digital visual media item that represent an object. In particular, a segmentation mask can refer to a filter useful for partitioning a digital visual media item into separate portions. For example, a segmentation mask can include a filter that corresponds to a digital visual media item that identifies a portion of the digital visual media item (i.e., pixels of the digital visual media item) belonging to one or more objects and a portion of the digital visual media item belonging to a background. For example, in some embodiments, a segmentation mask refers to a map of a digital visual media item that has an indication for each pixel of whether the pixel corresponds to part of an object or not. In such implementations, the indication includes a binary indication (a 1 for pixels belonging to the object and a zero for pixels not belonging to the object). In alternative implementations, the indication includes a probability (e.g., a number between 1 and 0) that indicates the likelihood that a pixel belongs to the one or more objects. In such implementations, the closer the value is to 1, the more likely the pixel belongs to the one or more objects and vice versa. In one or more embodiments, a segmentation mask has a resolution that differs from the resolution of the corresponding digital visual media item.

Relatedly, as used herein, the term "initial segmentation mask" refers to a segmentation mask generated directly from the corresponding digital visual media item. For example, in some embodiments an initial segmentation mask refers to a first segmentation mask generated by a segmentation refinement neural network based on the corresponding digital visual media item. As used herein, the term "refined segmentation mask" refers to a segmentation mask generated based on another segmentation mask, such as an initial segmentation mask or a preceding refined segmentation mask. In particular, in some instances, a refined segmentation mask refers to a segmentation mask having less uncertain pixels than a preceding segmentation mask. As used herein, the term "sky mask" refers to a segmentation mask that distinguishes a sky depicted in a digital visual media item from a ground or foreground depicted in the digital visual media item. As used herein, the term "salient mask" refers to a segmentation mask that distinguishes one or more salient objects depicted in a digital visual media item from a background or surrounding environment depicted in the digital visual media item.

As used herein, the term "feature map" refers to a set of numerical values representing features utilized by a neural network, such as a segmentation refinement neural network. To illustrate, in some instances, a feature map includes a set of values corresponding to latent and/or patent attributes and characteristics of an input analyzed by a neural network (e.g., a digital visual media item). Relatedly, as used herein, the term "initial feature map" refers to a feature map generated by a neural network before a final feature map. As used herein, the term "final feature map" refers to a last feature map generated by a neural network. For example, in one or more embodiments, a final feature map includes a last feature map generated based on one or more initial feature maps.

As used herein, the term "feature value" refers to a numerical value included as part of a feature map. Indeed, in some instances, a feature value includes a value that corresponds to one or more latent and/or patent attributes and characteristics of an input analyzed by a neural network (e.g., a digital visual media item). In one or more embodiments, the term "low-level feature value" refers to a feature value that corresponds to one or more low-level (e.g., local) attributes and characteristics of an input analyzed by a neural network. In contrast, the term "high-level feature value" refers to a feature value that corresponds to one or more high-level (e.g., global or regional) attributes and characteristics of an input analyzed by a neural network.

Additionally, as used herein, the term "pixel" refers to a unit of a digital visual display element or a segmentation mask. Indeed, in one or more embodiments, a pixel includes a smallest distinguishable element of a digital visual display element or a segmentation mask. Indeed, in some implementations, a digital visual display element or a segmentation mask includes a plurality of pixels that collectively correspond to one or more portions of an image. Relatedly, as used herein, the term "resolution" refers to a number of pixels included in a digital visual display element or a segmentation mask. In some instances, a segmentation mask has a different resolution than a corresponding digital visual media item. In such instances, a pixel of the segmentation mask corresponds to multiple pixels of the corresponding digital visual media item.

Further, as used herein, the term "uncertain pixel" refers to a pixel having an uncertain classification. For example, in one or more embodiments, an uncertain pixel refers to a pixel having an associated uncertainty that the uncertain pixel corresponds to an object depicted in a digital visual media item or does not correspond object. For example, in some instances, an uncertain pixel includes a pixel of a segmentation mask associated with an uncertainty score that indicates that the classification of that pixel is uncertain. By contrast, as used herein, the term "certain pixel" refers to a pixel having a certain classification. For example, in one or more embodiments, a certain pixel refers to a pixel having an associated certainty that the certain pixel corresponds to an object depicted in a digital visual media item or does not correspond object. For example, in some instances, a certain pixel includes a pixel of a segmentation mask associated with an uncertainty score that indicates that the classification of that pixel is certain.

As used herein, the term "uncertainty score" refers to a value that indicates whether the classification of a pixel corresponding to the uncertainty score is certain or uncertain. In some embodiments, an uncertainty score includes a value between zero and one that indicates a likelihood that the classification of the corresponding pixel is certain. For example, in some instances, an uncertainty score that is closer to one indicates that classification is more likely to be certain, or vice versa. In some embodiments, an uncertainty score includes a binary value that indicates that the classification of a pixel has been determined to be certain or uncertain.

Additionally, as used herein, the term "uncertainty map" includes a set of uncertainty scores. For example, in some embodiments, an uncertainty map corresponds to a segmentation mask and includes a collection of uncertainty scores with each uncertainty score corresponding to a pixel of the segmentation mask. Indeed, in some implementations, an uncertainty map includes a one-channel map that gives an uncertainty score for each represented pixel.

As used herein, the term "mobile device" (or "mobile computing device") refers to a portable computing device. In particular, a mobile device includes a computing device designed for routine operation while a user is moving with the mobile device. For example, in one or more embodiments, a mobile device includes a smartphone or tablet.

Additional detail regarding the segmentation refinement system will now be provided with reference to the figures. For example, FIG. 1 illustrates a schematic diagram of an exemplary system 100 in which a segmentation refinement system 106 can be implemented. As illustrated in FIG. 1, the system 100 includes a server(s) 102, a network 108, and client devices 110a-110n.

Although the system 100 of FIG. 1 is depicted as having a particular number of components, the system 100 can have any number of additional or alternative components (e.g., any number of servers, client devices, or other components in communication with the segmentation refinement system 106 via the network 108). Similarly, although FIG. 1 illustrates a particular arrangement of the server(s) 102, the network 108, and the client devices 110a-110n, various additional arrangements are possible.

The server(s) 102, the network 108, and the client devices 110a-110n may be communicatively coupled with each other either directly or indirectly (e.g., through the network 108 discussed in greater detail below in relation to FIG. 11). Moreover, the server(s) 102 and the client devices 110a-110n may include a variety of computing devices (including one or more computing devices as discussed in greater detail with relation to FIG. 11).

As mentioned above, the system 100 includes the server(s) 102. The server(s) 102 can generate, store, receive, and/or transmit data, including digital video media items and corresponding refined segmentation masks. For example, in one or more embodiments, the server(s) 102 receives a digital visual media item from a client device (e.g., one of the client devices 110a-110n) and transmits a refined segmentation mask corresponding to the digital visual media item to the client device or another client device. In one or more embodiments, the server(s) 102 comprises a data server. The server(s) 102 can also comprise a communication server or a web-hosting server.

As shown in FIG. 1, the server(s) 102 include an image editing system 104. In one or more embodiments, the image editing system 104 provides functionality by which a user (e.g., a user of one of the client devices 110a-110n) can generate, edit, manage, and/or store digital visual media items, such as digital photos or digital videos. For example, in some instances, a user utilizes a client device to send a digital visual media item to the image editing system 104 hosted on the server(s) 102 via the network 108. The image editing system 104 then provides many options that the user may use to edit the digital visual media item, store the digital visual media item, and subsequently search for, access, and view the digital visual media item.

Additionally, the server(s) 102 includes the segmentation refinement system 106. In particular, in one or more embodiments, the segmentation refinement system 106 utilizes the server(s) 102 to generate refined segmentation masks for digital visual media items. For example, the segmentation refinement system 106 can utilize the server(s) 102 to identify a digital visual media item and generate a refined segmentation mask for the digital visual media item.

To illustrate, in one or more embodiments, the segmentation refinement system 106, via the server(s) 102, identifies a digital visual media item that includes a plurality of pixels and depicts one or more objects. The segmentation refinement system 106, via the server(s) 102, further utilizes a segmentation refinement neural network to generate an initial segmentation mask for the digital visual media item by determining whether the plurality of pixels correspond to the one or more objects. Via the server(s) 102, the segmentation refinement system 106 further utilizes the segmentation refinement neural network to determine or identify uncertain pixels based on the initial segmentation mask. Further, the segmentation refinement system 106, via the server(s) 102, generates a refined segmentation mask for the digital visual media item by redetermining whether a set of uncertain pixels correspond to the one or more objects.

In one or more embodiments, the client devices 110a-110n include computing devices that can access, edit, store, and/or provide, for display, digital visual media items. For example, the client devices 110a-110n can include smartphones, tablets, desktop computers, laptop computers, head-mounted-display devices, or other electronic devices. The client devices 110a-110n include one or more applications (e.g., the image editing application 112) that can access, edit, segment, modify, store, and/or provide, for display, digital visual media items. For example, in one or more embodiments, the image editing application 112 includes a software application installed on the client devices 110a-110n. Additionally, or alternatively, the image editing application 112 includes a software application hosted on the server(s) 102 (service and supported by the image editing system 104), which may be accessed by the client devices 110a-110n through another application, such as a web browser.

The segmentation refinement system 106 can be implemented in whole, or in part, by the individual elements of the system 100. Indeed, although FIG. 1 illustrates the segmentation refinement system 106 implemented with regard to the server(s) 102, different components of the segmentation refinement system 106 can be implemented by a variety of devices within the system 100. For example, one or more (or all) components of the segmentation refinement system 106 can be implemented by a different computing device (e.g., one of the client devices 110a-110n) or a separate server from the server(s) 102 hosting the image editing system 104. In particular, in one or more embodiments, the segmentation refinement system 106 is resident on and implemented entirely by a client device (e.g., a mobile computing device). In such embodiments, the server(s) 102 generate and train the segmentation refinement neural network. A client device 110a-110n then receives (e.g., downloads) the segmentation refinement neural network from the server(s) 102. Once downloaded, the client device 110a-110n and utilize the 110a-110n to segment live digital video streams or other digital visual media. Example components of the segmentation refinement system 106 will be described below with regard to FIG. 9.

Figure 2:
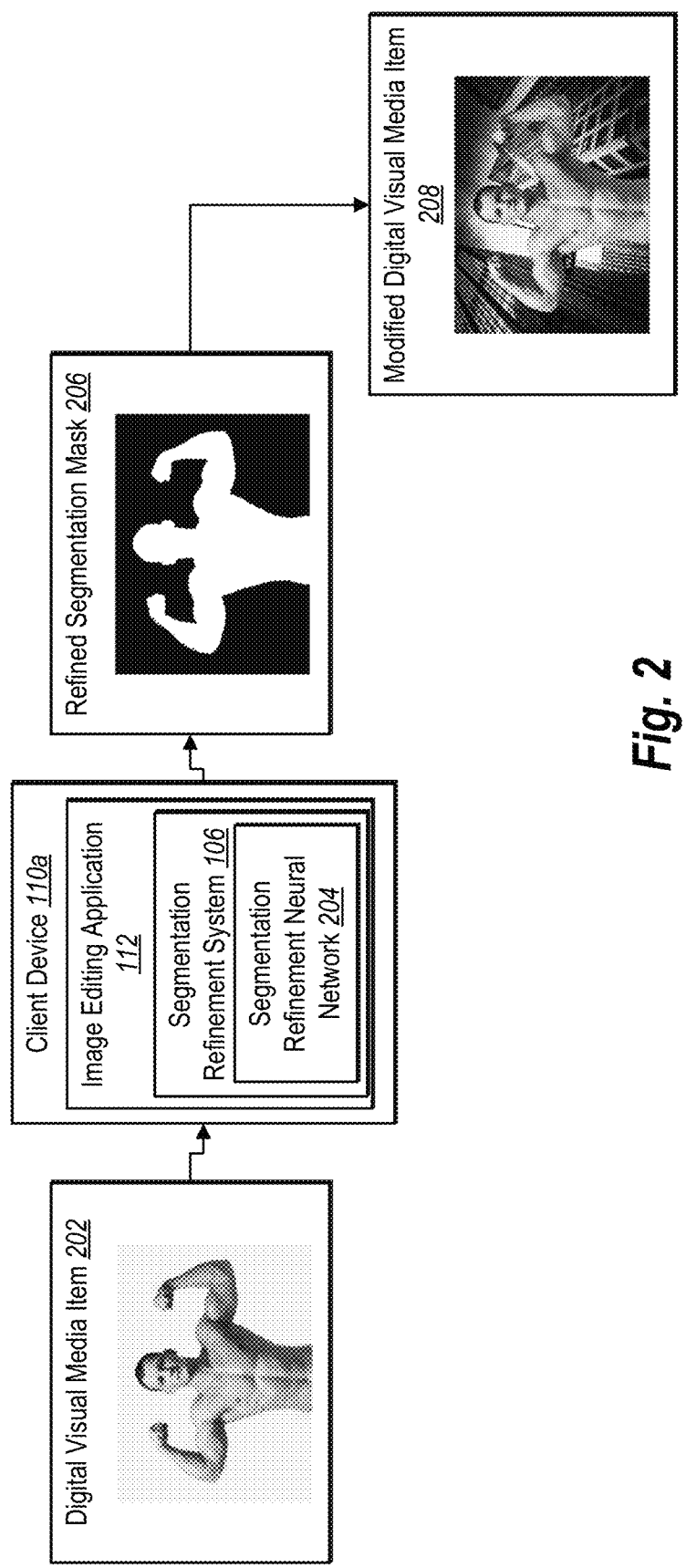
FIG. 2 illustrates an overview diagram of the segmentation refinement system generating a refined segmentation mask for a digital visual media item in accordance with one or more embodiments.

As mentioned above, in one or more embodiments, the segmentation refinement system 106 generates refined segmentation masks for digital visual media items. FIG. 2 illustrates an overview diagram of the segmentation refinement system 106 generating a refined segmentation mask for a digital visual media item in accordance with one or more embodiments.

As shown in FIG. 2, the segmentation refinement system 106 identifies a digital visual media item 202. In one or more embodiments, the segmentation refinement system 106 identifies the digital visual media item 202 by receiving the digital visual media item 202 from a computing device (e.g., a third-party system or a client device) or receiving user input indicating a digital visual media item 202 to segment. In some embodiments, however, the segmentation refinement system 106 identifies the digital visual media item 202 by accessing a database storing digital visual media items. For example, the segmentation refinement system 106 can maintain a database and store a plurality of digital visual media items therein. In some instances, an external device or system stores digital visual media items for access by the segmentation refinement system 106.

As discussed above, in some instances, the segmentation refinement system 106 operates on a mobile computing device, such as a smart phone or a tablet. Accordingly, in some embodiments, the segmentation refinement system 106 identifies the digital visual media item 202 by accessing the digital visual media item 202 from local storage, detecting that the mobile device has captured the digital visual media item 202, or by determining that the mobile device has activated a camera to capture the digital visual media item (e.g., is capturing a digital video feed or is setup to capture a digital photo).

In one or more embodiments, the digital visual media item 202 includes a plurality of pixels. Further, in some embodiments, the digital visual media item 202 depicts one or more objects. For example, in some instances, the digital visual media item 202 depicts one or more objects against a background.

As shown in FIG. 2, the segmentation refinement system 106 utilizes a segmentation refinement neural network 204 to analyze the digital visual media item 202. In one or more embodiments, the segmentation refinement neural network 204 includes a neural network architecture that generates an initial segmentation mask for the digital visual media item 202 and further generates one or more refined segmentation masks based on the initial segmentation mask. For example, in some embodiments, the segmentation refinement neural network 204 includes a convolutional neural network for generating initial segmentation masks and also includes a multi-layer perceptron renderer for generating refined segmentation masks. The architecture of the segmentation refinement neural network 204 will be discussed in more detail below with reference to FIG. 3.

As shown in FIG. 2, based on the analysis of the digital visual media item 202 by the segmentation refinement neural network 204, the segmentation refinement system 106 generates a refined segmentation mask 206. In some instances, the refined segmentation mask 206 identifies whether or not the pixels of the digital visual media item 202 correspond to one or more objects depicted in the digital visual media item 202. For example, in some embodiments, the refined segmentation mask 206 provides probabilities that the pixels of the digital visual media item 202 correspond to the one or more objects depicted in the digital visual media item 202.

Additionally, as shown in FIG. 2, the segmentation refinement system 106 modifies the digital visual media item 202 based on the refined segmentation mask 206 to generate the modified digital visual media item 208. For example, in one or more embodiments, the segmentation refinement system 106 applies one or more filters or other effects to the object(s) or the background depicted in the digital visual media item 202. In some embodiments, the segmentation refinement system 106 replaces the background depicted in the digital visual media item 202 or removes the object(s) for use in an image or video composition.

Figure 3:
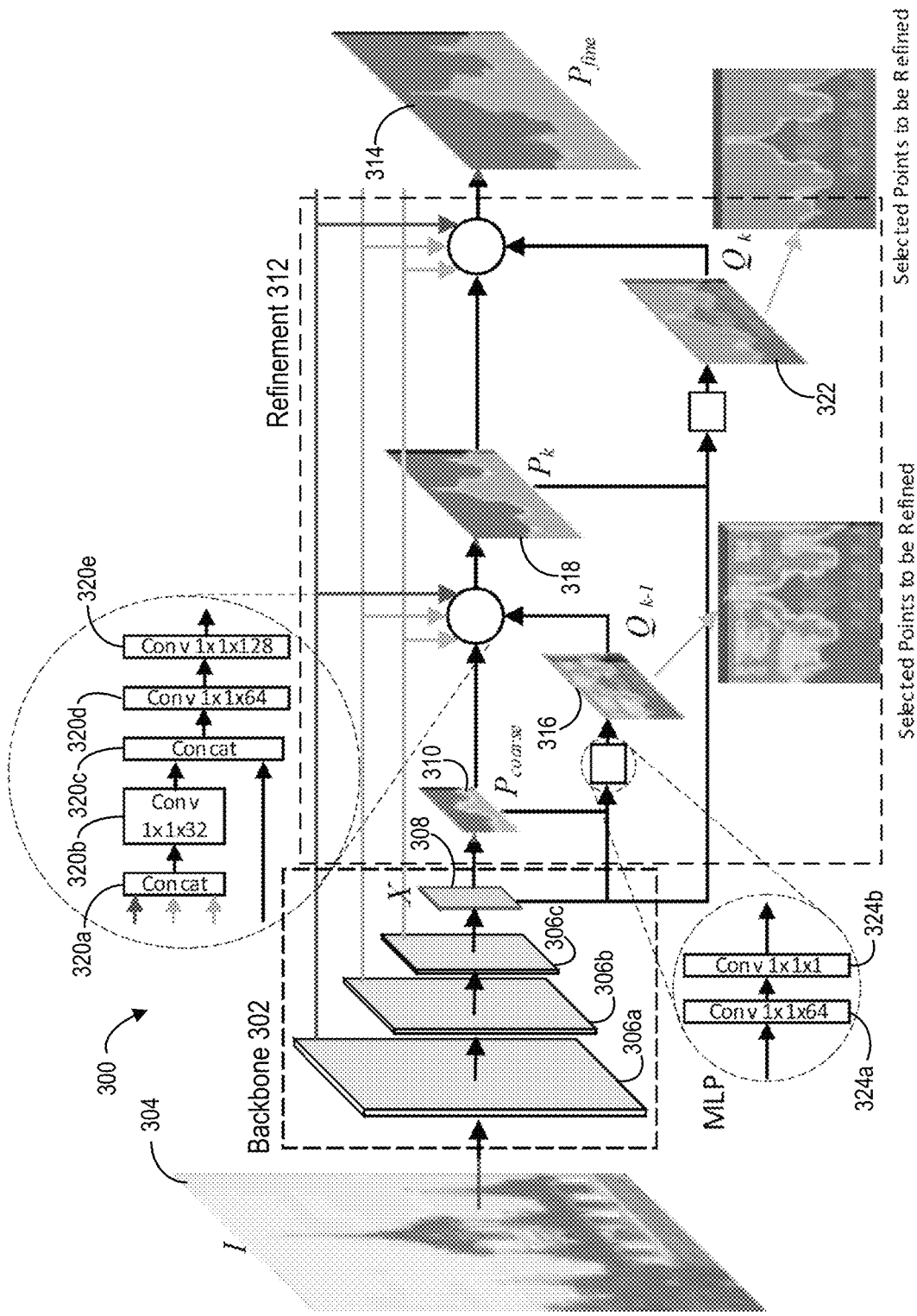
FIG. 3 illustrates a schematic diagram of a segmentation refinement neural network in accordance with one or more embodiments.

As mentioned above, in some implementations, the segmentation refinement system 106 utilizes a segmentation refinement neural network to generate a refined segmentation mask for a digital visual media item. FIG. 3 illustrates a schematic diagram of a segmentation refinement neural network 300 in accordance with one or more embodiments.

As shown in FIG. 3, the segmentation refinement neural network 300 includes a backbone neural network component 302. In one or more embodiments, the segmentation refinement neural network 300 utilizes the backbone neural network component 302 to generate a set of feature maps corresponding to a digital visual media item 304 used as input. For example, as shown in FIG. 3, the segmentation refinement neural network 300 utilizes the backbone neural network component 302 to generate the initial feature maps 306a-306c and the final feature map 308. In one or more embodiments, the segmentation refinement neural network 300 generates the initial feature maps 306a-306c and the final feature map 308 sequentially. For example, in some embodiments, the segmentation refinement neural network 300 generates the initial feature map 306a based on the digital visual media item 304, generates the initial feature map 306b based on the initial feature map 306a, generates the initial feature map 306c based on the initial feature map 306b, and generates the final feature map 308 based on the initial feature map 306c. Though FIG. 3, illustrates a particular number of initial feature maps, the segmentation refinement neural network 300 generates various numbers of initial feature maps in various embodiments.

In one or more embodiments, the initial feature maps 306a-306c include low-level feature values corresponding to the digital visual media item 304 and the final feature map 308 includes high-level feature values corresponding to the digital visual media item 304. In some instances, the initial feature maps 306a-306c include progressively higher-level feature values (e.g., with the initial feature map 306c including the highest-level feature values) that are still lower in level than the feature values of the final feature map 308. In other words, when generating the initial feature maps 306a-306c, the segmentation refinement neural network 300 progressively determines higher-level feature values corresponding to the digital visual media item 304. Accordingly, when generating the final feature map 308, the segmentation refinement neural network 300 determines the highest-level (comparatively) feature values corresponding to the digital visual media item.

As shown in FIG. 3 by the relative sizes, the final feature map 308 has a resolution that is different than the resolution of the digital visual media item 304. For example, in some embodiments, the final feature map 308 has a resolution that is lower than the resolution of the digital visual media item 304. To illustrate, in some implementations, the digital visual media item 304 is representable as $I \in \mathbb{R}^{H \times W \times C}$ where H and W represent the height and width (e.g., in pixels) of the digital visual media item 304, respectively, and C represents the number of associated classes. Further, in some implementations, the segmentation refinement neural network 300 generates the final feature map 308, represented as $X \in \mathbb{R}^{h \times w \times d}$ where h and w similarly represent the height and width (e.g., in pixels) of the final feature map 308, respectively and d represents the number of channels of extracted features. Indeed, in some embodiments, the segmentation refinement neural network 300 generates the final feature map 308 so that h and w are a fraction of the size of H and W.

As further shown in FIG. 3, the segment refinement neural network 300 utilizes the backbone neural network component 302 to generate an initial segmentation mask 310 for the digital visual media item 304. In particular, in some embodiments, the segment refinement neural network 300 generates the initial segmentation mask 310 based on the final feature map 308. Thus, in some instances, the segmentation refinement neural network 300 generates the initial segmentation mask 310 using the high-level feature values that correspond to the digital visual media item 304 and are represented in the final feature map 308. In one or more embodiments, the initial segmentation mask 310 has the same resolution as the final feature map 308. In particular, the segment refinement neural network 300 processes the final feature map 308 utilizing one or more fully connected neural network layers or a neural network classifier to generate the initial segmentation mask 310.

In one or more embodiments, the backbone neural network component 302 includes a convolutional neural network. Indeed, the backbone neural network component 302 includes various configurations of a convolutional neural network. For example, in one or more embodiments, the backbone neural network component 302 includes at least one of the convolutional neural network architectures described in U.S. patent application Ser. No. 15/799,395, filed on Oct. 31, 2017, which is incorporated herein by reference in its entirety.

As further shown in FIG. 3, the segmentation refinement neural network 300 includes a refinement neural network component 312. In some implementations, the refinement neural network component 312 includes a multi-layer perceptron renderer.

In one or more embodiments, the segmentation refinement neural network 300 utilizes the refinement neural network component 312 to generate a refined segmentation mask 314 for the digital visual media item 304. For example, in some instances, the segmentation refinement neural network 300 utilizes the refinement neural network component 312 to determine or identify uncertain pixels based on the initial segmentation mask 310 and generate the refined segmentation mask 314 by redetermining whether a set of the uncertain pixels correspond to the one or more objects depicted by the digital visual media item 304. Indeed, in one or more embodiments, the initial segmentation mask 310 captures the location and rough shape of one or more objects depicted by the digital visual media item 304 but loses local details—leading to the uncertain pixels. Accordingly, the segmentation refinement neural network 300 generates the refined segmentation mask 314 to recapture the local details and improve the quality of the segmentation mask generated for the digital visual media item 304.

As just mentioned, in one or more embodiments, the segmentation refinement neural network 300 determines uncertain pixels based on the initial segmentation mask 310 (e.g., identifies the uncertain pixels of the initial segmentation mask 310). For example, in one or more embodiments, the segmentation refinement neural network 300 utilizes the refinement neural network component 312 to generate an uncertainty map 316 that identifies the uncertain pixels. In particular, in some implementations, the segmentation refinement neural network 300 generates the uncertainty map 316 based on the final feature map 308 and the initial segmentation mask 310. For example, in some embodiments, the segmentation refinement neural network 300 concatenates the final feature map 308 and the initial segmentation mask 310 and generates the uncertainty map 316 based on the resulting concatenation. Further, in some implementations, the segmentation refinement neural network 300 generates the uncertainty map 316 utilizing one or more neural network layers (e.g., the neural network layers 324a-324b) having learned network weights. Indeed, in some implementations, the segmentation refinement neural network 300 learns various network weights via training as will be discussed in more detail below with reference to FIG. 4.

As previously mentioned, in one or more embodiments, the uncertainty map 316 provides uncertainty scores for the pixels of the initial segmentation mask 310. Thus, the uncertainty map 316 identifies the uncertain pixels of the initial segmentation mask 310 based on the included uncertainty scores. Similarly, in some implementations. the uncertainty map 316 identifies the certain pixels of the initial segmentation mask 310 based on the included uncertainty scores. As mentioned above, in one or more embodiments, the uncertainty map 316 includes a one-channel map; accordingly, the segmentation refinement system 106 represents the uncertainty map generated for the k-th iteration of segmentation refinement as $Q_{k-1} \in h_{k-1} \times W_{k-1} \times 1$.

As shown in FIG. 3, the segmentation refinement neural network 300 further utilizes the refinement neural network component 312 to generate the refined segmentation mask 318 for the digital visual media item 304. In particular, in one or more embodiments, the segmentation refinement neural network 300 generates the refined segmentation mask 318 by redetermining whether a set of the uncertain pixels of the initial segmentation mask 310 belong to the one or more objects depicted in the digital visual media item 304. In some implementations, the segmentation refinement neural network 300 generates the refined segmentation mask 318 based on the final feature map 308 and the uncertainty map 316. In some instances, the segmentation refinement neural network 300 generates the refined segmentation mask 318 further based on the initial feature maps 306a-306c. Further, in some implementations, the segmentation refinement neural network 300 generates the refined segmentation mask 318 utilizing one or more neural network layers (e.g., the neural network layers 320a-320e), one or more of which have learned network weights.

To illustrate, in one or more embodiments, the segmentation refinement neural network 300 re-samples the initial feature maps 306a-306c to match the desired resolution for the refined segmentation mask 318. Indeed, as shown in FIG. 3, the initial feature maps 306a-306c have various resolutions. Accordingly, the segmentation refinement neural network up-samples or down-samples each of the initial feature maps 306a-306c as needed to match the desired resolution of the refined segmentation mask 318—and so that the resolutions of the initial feature maps 306a-306c match one another. In one or more embodiments, the segmentation refinement neural network 300 utilizes interpolation (e.g., bi-linear interpolation) to up-sample when needed. In some implementations, the segmentation refinement neural network 300 further concatenates the re-sampled initial feature maps.

In one or more embodiments, the segmentation refinement neural network 300 extracts, from the initial feature maps 306a-306c (e.g., from the concatenation of the re-sampled initial feature maps), feature values associated with the uncertain pixels identified by the uncertainty map 316. Indeed, as previously mentioned, the initial feature maps 306a-306c include low-level feature values corresponding to the digital visual media item 304. Accordingly, in some implementations, the segmentation refinement neural network 300 extracts, from the low-level feature values of the initial feature maps 306a-306c, a subset of low-level feature values that correspond to the uncertain pixels of the initial segmentation mask 310. In one or more embodiments, the segmentation refinement neural network 300 up-samples the uncertainty map 316 (e.g., using interpolation, such as bi-linear interpolation) to the desired resolution of the refined segmentation mask 318 and the re-sampled initial feature maps in order to correctly identify the feature values of the re-sampled initial feature maps that correspond to the uncertain pixels. In some embodiments, however, the segmentation refinement neural network 300 extracts the feature values corresponding to the uncertain pixels and then re-samples and concatenates the extracted feature values.

In some implementations, the segmentation refinement neural network 300 further up-samples the final feature map 308 (e.g., via interpolation, such as bi-linear interpolation) to match the desired resolution of the refined segmentation mask 318. Further, in some embodiments, the segmentation refinement neural network 300 extracts, from the final feature map 308, feature values associated with the uncertain pixels identified by the uncertainty map 316. Indeed, as previously mentioned, the final feature map 308 includes high-level feature values corresponding to the digital visual media item 304. Accordingly, in some implementations, the segmentation refinement neural network 300 extracts, from the high-level feature values of the final feature map 308, a subset of high-level feature values that correspond to the uncertain pixels of the initial segmentation mask 310. Further, in one or more embodiments, the segmentation refinement neural network 300 extracts, from the final feature map 308, feature values associated with the certain pixels identified by the uncertainty map 316.

In one or more implementations, the segmentation refinement neural network 300 generates the refined segmentation mask 318 based on the extracted feature values for the certain pixels (i.e., high-level features from the final feature map 308) and the extracted feature values for the uncertain pixels (i.e., high-level features from the final feature map 308 and low level features from the initial feature maps 306a-306c) identified by the uncertainty map 316. For example, as shown in FIG. 3, the segmentation refinement neural network 300 provides the feature values extracted from the initial feature maps 306a-306c (e.g., from the concatenation of the re-sampled initial feature maps) to a convolutional layer (e.g., the neural network layer 320b) and concatenates the output of the convolutional layer with the final feature map 308 (e.g., with the feature values for the uncertain pixels and the certain pixels that were extracted from the final feature map 308). As shown in FIG. 3, the segmentation refinement neural network 300 provides the resulting concatenation to one or more convolutional layers (e.g., the neural network layers 320d-320e).

In one or more embodiments, the segmentation refinement neural network 300 provides the output of the one or more convolutional layers to a classifier to generate the refined segmentation mask 318. Accordingly, in one or more embodiments, the segmentation refinement neural network 300 generates the refined segmentation mask 318 by redetermining whether the uncertain pixels correspond to the one or more objects depicted in the digital visual media item 304 based on the feature values associated with the uncertain pixels (e.g., those feature values extracted from the initial feature maps 306a-306c and/or those extracted from the final feature map 308). In some embodiments, the segmentation refinement neural network 300 generates the refined segmentation mask 318 by further redetermining whether the certain pixels correspond to the one or more objects depicted in the digital visual media item 304 based on the feature values associated with the certain pixels (e.g., those feature values extracted from the final feature map 308). Indeed, in some implementations, the segmentation refinement neural network 300 reclassifies all pixels. In other words, the segmentation refinement neural network 300 generates updated probabilities that the pixels correspond to the one or more objects depicted in the digital visual media item 304. As shown in FIG. 3, in some implementations, the refined segmentation mask 318 has a higher resolution than then initial segmentation mask 310.

In some implementations, the segmentation refinement neural network 300 redetermines whether a set of the identified uncertain pixels (e.g., a set less than all of the identified uncertain pixels) correspond to the one or more objects when generating the refined segmentation mask 318. For example, in some embodiments, the segmentation refinement neural network 300 determines a ranking of the uncertainty scores provided by the uncertainty map 316 and selects the top n uncertain pixels to reclassify based on the ranking. For example, in some instances, the segmentation refinement neural network 300 extracts only those low-level feature values from the initial feature maps 306a-306c associated with the top n uncertain pixels and relies on the high-level feature values extracted from the final feature map 308 for the remaining uncertain pixels.

In one or more embodiments, the segmentation refinement neural network 300 establishes the value of n based on the desired resolution of the refined segmentation mask 318. Accordingly, in some instances, the segmentation refinement neural network 300 reclassifies all identified uncertain pixels. In some embodiments, however, the segmentation refinement neural network 300 establishes a maximum reclassification number and establishes the value of n based on the maximum reclassification number. Accordingly, in some instances, if the desired resolution for the refined segmentation mask 318 exceeds the maximum reclassification number, the segmentation refinement neural network 300 reclassifies a set of uncertain pixels that includes less than all identified uncertain pixels. Thus, the segmentation refinement system 106 focuses the segmentation refinement neural network 300 on reclassifying those pixels that are most uncertain.

Thus, as described above, the segmentation refinement neural network 300 utilizes the refinement neural network component 312 to generate the refined segmentation mask 318. In one or more embodiments, the segmentation refinement neural network 300 similarly utilizes the refinement neural network component 312 to generate the refined segmentation mask 314. For example, as shown in FIG. 3, the segmentation refinement neural network 300 generates the uncertainty map 322 based on the refined segmentation mask 318 and the final feature map 308. Further, the segmentation refinement neural network 300 extracts feature values associated with the uncertain pixels and the certain pixels identified by the uncertainty map 322 from the initial feature maps 306a-306c and/or the final feature map 308 and generates the refined segmentation mask 314 accordingly.

Though FIG. 3, illustrates two refinement iterations (i.e., generation of two refined segmentation masks), the segmentation refinement neural network 300 performs more or less iterations in various embodiments. For example, in one embodiment, the segmentation refinement neural network 300 performs one refinement iteration and utilizes the resulting refined segmentation mask for the digital visual media item 304 (e.g., to modify the digital visual media item 304). In some implementations, with each refinement iteration, the segmentation refinement neural network 300 increases the resolution of the generated refined segmentation mask. For example, in some embodiments, the segmentation refinement neural network 300 doubles the resolution of the refined segmentation mask generated in each iteration. Accordingly, the segmentation refinement neural network 300 down-samples or up-samples the initial feature maps 306a-306c, the final feature map 308, and/or the uncertainty map generated for that iteration as needed to generate a refined segmentation mask of the appropriate resolution. In one or more embodiments, the segmentation refinement system 106 configures the segmentation refinement neural network 300 so that the resolution of the final refined segmentation mask matches the resolution of the digital visual media item used as input or reaches some other resolution that is useful in applying the final refined segmentation mask to the digital visual media item. As the resolution increases, the segmentation refinement neural network 300 focuses more on local details.

In one or more embodiments, the segmentation refinement system 106 modifies the number of refinement iterations performed by the segmentation refinement neural network 300 based on the capabilities of the implementing computing device. For example, the segmentation refinement system 106 can configure the segmentation refinement neural network 300 to perform more refinement iterations when implemented by a computing device having a large amount of available resources (e.g., a server) or to perform less refinement iterations when implemented by a computing device having a small amount of available resources (e.g., a mobile device). Thus, the segmentation refinement system 106 can flexibly accommodate the varying capacities of different computing devices.

Further, by utilizing the segmentation refinement neural network 300 discussed above, the segmentation refinement system 106 operates more accurately than conventional systems, especially those designed to operate on smaller, mobile computing devices. Indeed, by employing a segmentation refinement neural network that utilizes one or more neural network layers having learned network weights, the segmentation refinement system 106 identifies uncertain pixels with a higher accuracy than many conventional systems, such as those using a heuristic approach. Thus, the segmentation refinement system 106 improves upon the accuracy with which segmentation masks are refined. Further, by focusing refinement on identified uncertain pixels, the segmentation refinement system 106 can utilize a smaller, more efficient model when compared to conventional systems.

Thus, the segmentation refinement system 106 generates an initial segmentation mask for a digital visual media item. The segmentation refinement system 106 determines or identifies uncertain pixels of the initial segmentation mask. Further, the segmentation refinement system 106 iteratively modifies the initial segmentation mask based on uncertain pixels. The algorithms and acts described with reference to FIG. 3 can comprise the corresponding structure for performing a step for iteratively modifying the initial segmentation mask based on the uncertain pixels. Additionally, the segmentation refinement neural network architecture described with reference to FIG. 3 can comprise the corresponding structure for performing a step for iteratively modifying the initial segmentation mask based on the uncertain pixels.

Figure 4:
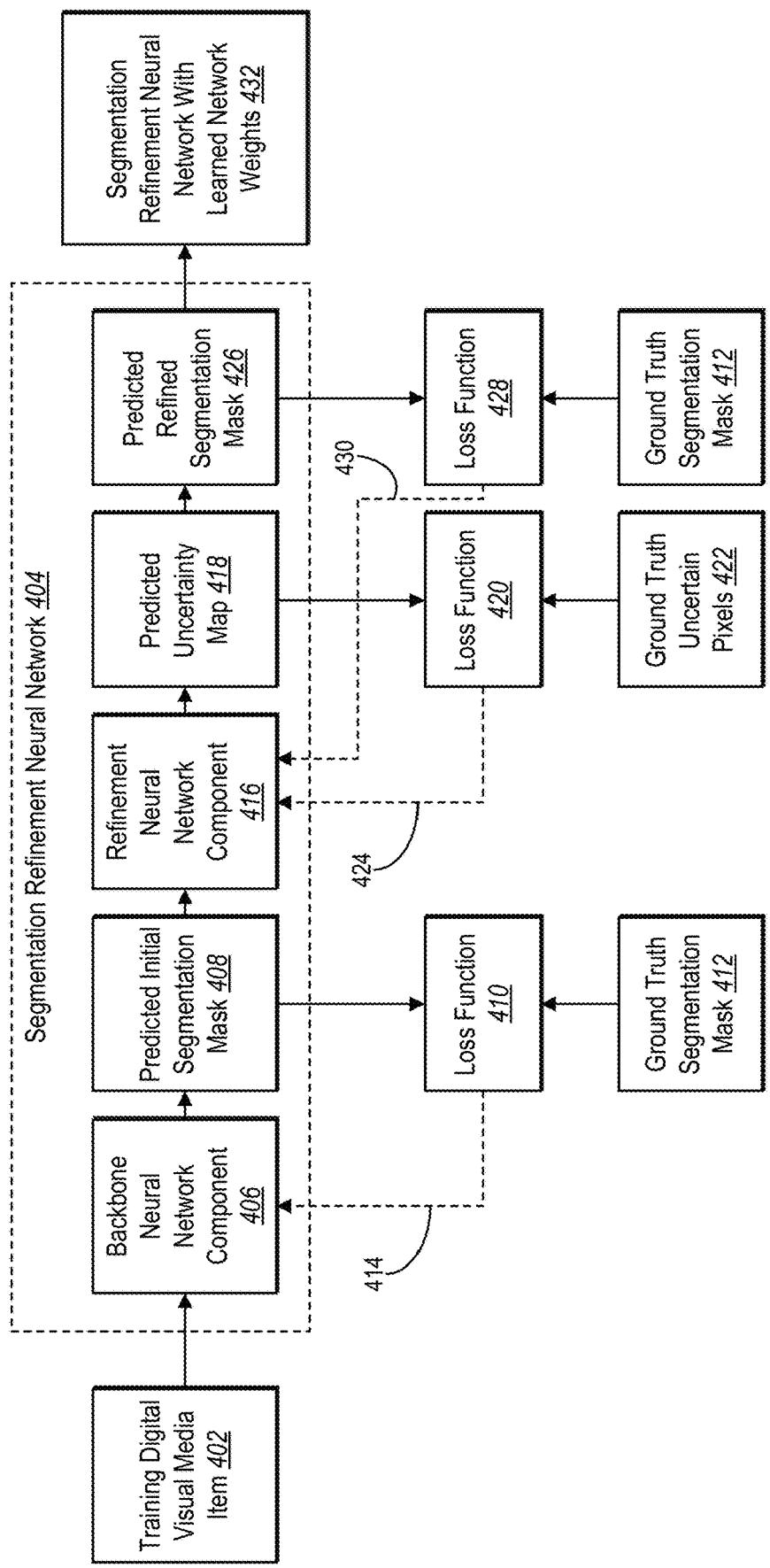
FIG. 4 illustrates a block diagram illustrating a process for training a segmentation refinement neural network in accordance with one or more embodiments.

As mentioned above, in one or more embodiments, the segmentation refinement system 106 trains a segmentation refinement neural network to generate refined segmentation masks for digital visual media items. FIG. 4 illustrates a block diagram of the segmentation refinement system 106 training a segmentation refinement neural network in accordance with one or more embodiments. In particular, FIG. 4 illustrates a single iteration from an iterative training process.

As shown in FIG. 4, the segmentation refinement system 106 implements the training by providing a training digital visual media item 402 to the segmentation refinement neural network 404. In one or more embodiments, the training digital visual media item 402 includes a labeled image. Further, as shown, the segmentation refinement system 106 utilizes a backbone neural network component 406 of the segmentation refinement neural network 404 to generate a predicted initial segmentation mask 408. Indeed, in some implementations, the segmentation refinement system 106 utilizes the backbone neural network component 406 of the segmentation refinement neural network 404 to generate the predicted initial segmentation mask 408 as discussed above with reference to FIG. 3.

As shown in FIG. 4, in some embodiments, the segmentation refinement system 106 utilizes the loss function 410 to determine the loss (i.e., error) resulting from the segmentation refinement neural network 404 (e.g., resulting from the backbone neural network component 406) by comparing the predicted initial segmentation mask 408 with the ground truth segmentation mask 412. In one or more embodiments, the segmentation refinement system 106 utilizes, as the loss function 410, a cross-entropy error defined as follows:

$$\mathcal{L}_{mask} = E[-Y \ln(P_{mask})] \qquad (1)$$

In algorithm 1, $P_{mask}$ represents the predicted initial segmentation mask 408 and Y represents the ground truth segmentation mask 412 that corresponds to the training digital visual media item 402, where $Y \in Z_+^c$.

In one or more embodiments, the segmentation refinement system 106 back propagates the determined loss to the segmentation refinement neural network 404 (as shown by the dashed line 414) to optimize the model by updating its parameters/weights. For example, in some instances, the segmentation refinement system 106 back propagates the determined loss to the backbone neural network component 406 to optimize the backbone neural network component 406 by updating its parameters/weights. Indeed, the segmentation refinement system 106 updates the parameters/weights to minimize the error of the segmentation refinement neural network 404, such as the error determined using the loss function defined by algorithm 1.

Further, as shown in FIG. 4, in one or more embodiments, the segmentation refinement system 106 utilizes a refinement neural network component 416 of the segmentation refinement neural network 404 to generate a predicted uncertainty map 418. Indeed, in some implementations, the segmentation refinement system 106 utilizes the refinement neural network component 416 of the segmentation refinement neural network 404 to generate the predicted uncertainty map 418 as discussed above with reference to FIG. 3.

As shown in FIG. 4, in some embodiments, the segmentation refinement system 106 utilizes the loss function 420 to determine the loss (i.e., error) resulting from the segmentation refinement neural network 404 (e.g., resulting from the refinement neural network component 416) by comparing the predicted uncertainty map 418 with the ground truth uncertain pixels 422. In one or more embodiments, the segmentation refinement system 106 determines or identifies the ground truth uncertain pixels 422 from the comparison between the predicted initial segmentation mask 408 and the ground truth segmentation mask 412. In one or more embodiments, the segmentation refinement system 106 utilizes, as the loss function 420, a smooth L–1 loss defined as follows:

$$\mathcal{L}_{uncertain} = \begin{cases} \frac{1}{2}\|Q_k - G_k\|_2^2, & |Q_k - G_k|_1 \leq 1, \\ |Q_k - G_k|_1 - 0.5, & |Q_k - G_k|_1 > 1 \end{cases} \quad (2)$$

In algorithm 2, $Q_k$ represents the predicted uncertain scores from the predicted uncertainty map 418 for the k-th iteration and $G_k$ represents the ground truth uncertain pixels 422.

In one or more embodiments, the segmentation refinement system 106 back propagates the determined loss to the segmentation refinement neural network 404 (as shown by the dashed line 424) to optimize the model by updating its parameters/weights. For example, in some instances, the segmentation refinement system 106 back propagates the determined loss to the refinement neural network component 416 to optimize the refinement neural network component 416 by updating its parameters/weights. Indeed, the segmentation refinement system 106 updates the parameters/weights to minimize the error of the segmentation refinement neural network 404, such as the error determined using the loss function defined by algorithm 2.

Additionally, as shown in FIG. 4, in some implementations, the segmentation refinement system 106 utilizes the refinement neural network component 416 of the segmentation refinement neural network 404 to generate a predicted refined segmentation mask 426. Indeed, in some instances, the segmentation refinement system 106 utilizes the refinement neural network component 416 of the segmentation refinement neural network 404 to generate the predicted refined segmentation mask 426 as discussed above with reference to FIG. 3

As shown in FIG. 4, in some instances, the segmentation refinement system 106 utilizes the loss function 428 to determine the loss (i.e., error) resulting from the segmentation refinement neural network 404 (e.g., resulting from the refinement neural network component 416) by comparing the predicted refined segmentation mask 426 with the ground truth segmentation mask 412. In one or more embodiments, the segmentation refinement system 106 utilizes, as the loss function 428, the cross-entropy error defined in equation 1.

In one or more embodiments, the segmentation refinement system 106 back propagates the determined loss to the segmentation refinement neural network 404 (as shown by the dashed line 430) to optimize the model by updating its parameters/weights. For example, in some instances, the segmentation refinement system 106 back propagates the determined loss to the refinement neural network component 416 to optimize the refinement neural network component 416 by updating its parameters/weights. Indeed, the segmentation refinement system 106 updates the parameters/weights to minimize the error of the segmentation refinement neural network 404, such as the error determined using the loss function defined by equation 1.

Though FIG. 4 illustrates training the segmentation refinement neural network 404 having one refinement iteration, it should be noted that, in some embodiments, the segmentation refinement system 106 trains a segmentation refinement neural network having multiple refinement iterations. Accordingly, as a general matter, the segmentation refinement system 106 determines the ground truth uncertain pixels for a particular refinement iteration by comparing the previously predicted segmentation mask—whether the predicted initial segmentation mask or a preceding predicted refined segmentation mask—with the ground truth segmentation mask corresponding to the training digital visual media item. Further, in some embodiments, the segmentation refinement neural network 404 re-samples the ground truth segmentation mask as needed to match the resolutions of the corresponding predicted initial segmentation mask and predicted refined segmentation mask(s).

In one or more embodiments, the segmentation refinement system 106 trains the backbone neural network component 406 and the refinement neural network component 416 together. For example, in some implementations the segmentation refinement system 106 generates, for a training iteration, a predicted initial segmentation mask, a predicted uncertainty map, and one or more predicted refined segmentation masks and compares the predictions to the applicable ground truths to determine and back propagate losses for updating network parameters/weights. In some embodiments, the segmentation refinement system 106 trains the backbone neural network component 406 and the refinement neural network component 416 using separate training iterations.

In one or more embodiments, with each iteration of training, the segmentation refinement system 106 gradually improves the accuracy with which the segmentation refinement neural network 404 generates refined segmentation masks for digital visual media items (e.g., by lowering the resulting loss value). Indeed, the segmentation refinement system 106 learns network weights/parameters that can be used to accurately generate the refined segmentation masks. Thus, the segmentation refinement system 106 generates the segmentation refinement neural network with learned network weights 432.

By training the segmentation refinement neural network to reclassify identified uncertain pixels, the segmentation refinement system 106 reduces the computational burdens of training experienced by many conventional systems. Indeed, the segmentation refinement system 106 focuses the training on the refinement of uncertain pixels, rather than the refinement of all pixels, thus lowering the computational resources required for the training process. Accordingly, in some implementations, the segmentation refinement system 106 operates more efficiently than conventional systems.

As mentioned above, in one or more embodiments, the segmentation refinement system 106 utilizes a refined segmentation mask generated for a digital visual media item to modify the digital visual media item. In particular, the segmentation refinement system 106 utilizes a refined segmentation mask to identify one or more objects depicted in the digital visual media item and modify the digital visual media item based on the identified object(s). In some embodiments, the segmentation refinement system 106 presents the modified digital visual media item for display on a user interface of a computing device, such as a mobile device implementing the segmentation refinement system 106. FIGS. 5A-5D illustrate a user interface for displaying a modified digital visual media item in accordance with one or more embodiments.

Figure 5B:
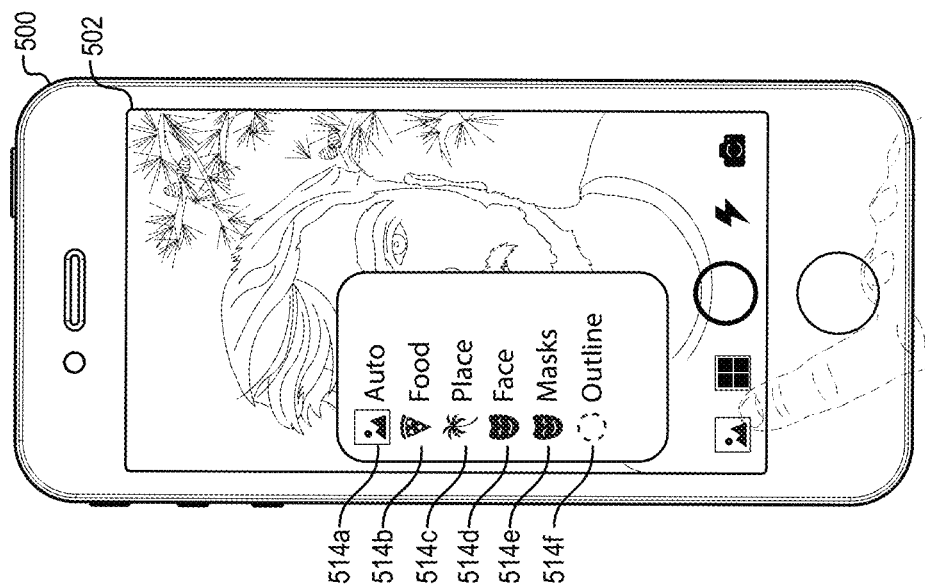
Figure 5A:
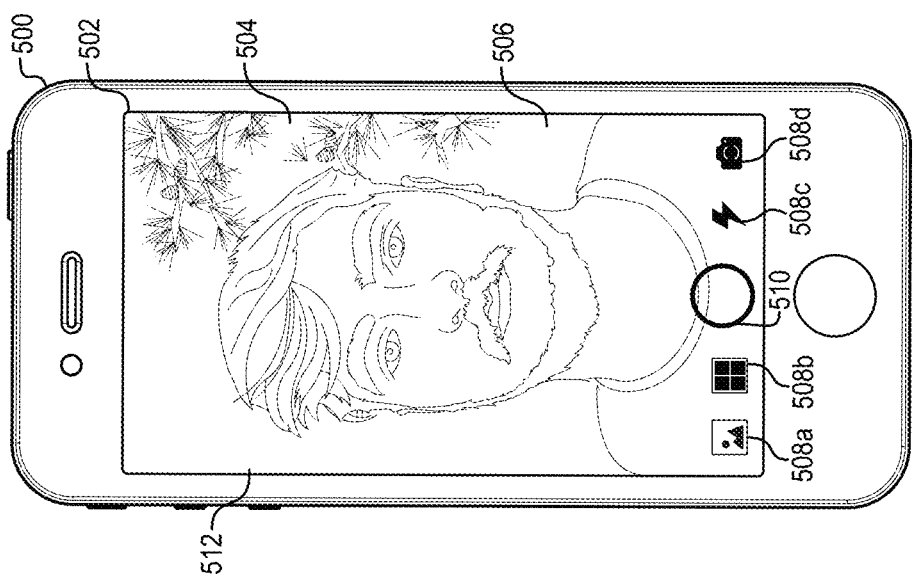

Specifically, FIG. 5A illustrates a mobile device 500 with a display 502 that includes a user interface 504. As shown in FIG. 5A, the user interface 504 includes a digital visual media item display element 506. In some embodiments, the segmentation refinement system 106 utilizes the digital visual media item display element 506 to display digital visual media items, including a digital video feed. For example, in FIG. 5A, the segmentation refinement system 106 displays, via the digital visual media item display element 506, a digital video feed 512 captured by a camera affixed to the mobile device 500.

In addition, as illustrated in FIG. 5A, the user interface 504 also includes selectable elements 508a (for identifying and/or modifying objects in digital visual media item), 508b (for accessing digital visual media items stored on the mobile device 500 and/or a remote server), 508c (for modifying a camera flush), and 508d (for modifying a camera utilized to capture digital visual media items, e.g., between a front and back facing camera). The user interface 504 also includes a capture element 510 (e.g., for storing and/or saving digital visual media, such as a digital video or digital image).

Based on user interaction with the selectable element 508a, the segmentation refinement system 106 can provide additional options for identifying and/or modifying objects in digital visual media items. For example, FIG. 5B illustrates the user interface 504 upon selection of the selectable element 508a. As shown, the user interface 504 includes a plurality of modification elements 514a-514f. Upon selection of one or more of the modification elements 514a-514f, the segmentation refinement system 106 can provide other, more detailed options for modifying a digital visual media item. For example, in some implementations, upon selection of the modification element 514c, the segmentation refinement system 106 provides specific modification options for modifying background pixels to look like a particular place (e.g., different selectable options for changing background pixels to look like a beach, a sports stadium, or a school).

In some implementations, upon selection of one of the modification elements 514a-514f (or other more specific modification options) the segmentation refinement system 106 identifies an object within the digital visual media item and modifies the digital visual media item. To illustrate, in some implementations, upon selection of the selectable element 514f (entitled "Outline"), the segmentation refinement system 106 identifies a salient object portrayed in the digital video feed 512 and modifies the digital video feed 512 to affix an outline to the identified object.

For example, FIG. 5C illustrates the segmentation refinement system 106 displaying, via the user interface 504, displaying a digital video feed 512 in three views 516a-516c, with an outline surrounding an individual portrayed in the digital video feed 512. As shown in FIG. 5C, the segmentation refinement system 106 applies a segmentation refinement neural network 518 to identify the person portrayed in the digital video feed 512. Moreover, the segmentation refinement system 106 modifies the digital video feed 512 to provide an outline (i.e., a dashed boundary line) around the identified person.

Moreover, the views 516b and 516c illustrate the segmentation refinement system 106 providing the outline in the digital video feed 512 over time (e.g., as the camera affixed to the mobile device 500 continues to capture the digital visual media item). The person depicted in the digital video feed 512 changes positions through the views 516a-516c. In each frame of the views 516a-516c, the segmentation refinement system 106 selects the moving person that is captured by depicted in the digital video feed 512. In particular, the segmentation refinement system 106 continuously captures the digital video feed 512, applies the segmentation refinement neural network 518 to the digital video feed 512 to identify the person in the real-time, modifies the digital video feed 512, and provides the modified digital video feed for display. In one or more embodiments, by progressively refining the prediction of uncertain pixels, the segmentation refinement system can stabilize the quality of the segmentation mask across frames of the digital video feed 512, allowing for more consistent modification of the digital video feed 512.

As mentioned above, the segmentation refinement system 106 can also capture a static digital image (e.g., a digital photo) and apply a segmentation refinement neural network to the static digital image. For example, in relation to FIG. 5C, the segmentation refinement system 106 detects user interaction with the capture element 510. In response, the segmentation refinement system 106 captures a digital image from the digital video feed 512 and applies a segmentation refinement neural network to the digital image.

Indeed, FIG. 5D illustrates a digital image 522 captured by the segmentation refinement system 106 (i.e., in response to user interaction with the capture element 510). As illustrated in FIG. 5D, the segmentation refinement system 106 applies the segmentation refinement neural network 520 to the digital image 522. By applying the segmentation refinement neural network 520, the segmentation refinement system 106 identifies the object depicted in the digital image 522 (e.g., similar to the identification from the digital video feed 512).

In addition, as shown in FIG. 5D, the segmentation refinement system 106 also modifies the digital image 522. In particular, the segmentation refinement system 106 applies the outline to the identified person in the digital image and provides the modified digital image for display.

Although FIGS. 5C-5D illustrates the segmentation refinement system 106 modifying digital visual media items by applying an outline of an object, the segmentation refinement system 106 applies a variety of different modifications to digital visual media items. Indeed, in some embodiments, rather than a dashed boundary line to indicate an identified object, the segmentation refinement system 106 modifies a digital visual media item by applying a filter; applying an overlay; modifying color, brightness, or hue; or replacing pixels (e.g., replacing an identified object or background pixels). For instance, in some implementations, the segmentation refinement system 106 modifies digital visual media items based on user interactions with the modification elements 514a-514f (or other more specific modification options). Alternatively, in one or more embodiments, the segmentation refinement system 106 automatically applies a modification to digital visual media items.

In one or more embodiments, the segmentation refinement system 106 provides options in the user interface 504 to store both a modified digital video feed of views 516a-516c and a modified digital image of view 516d. Moreover, in one or more embodiments, the segmentation refinement system 106 utilizes the user interface 504 to display (and modify) a digital media item stored on the mobile device 500.

Figure 6A:
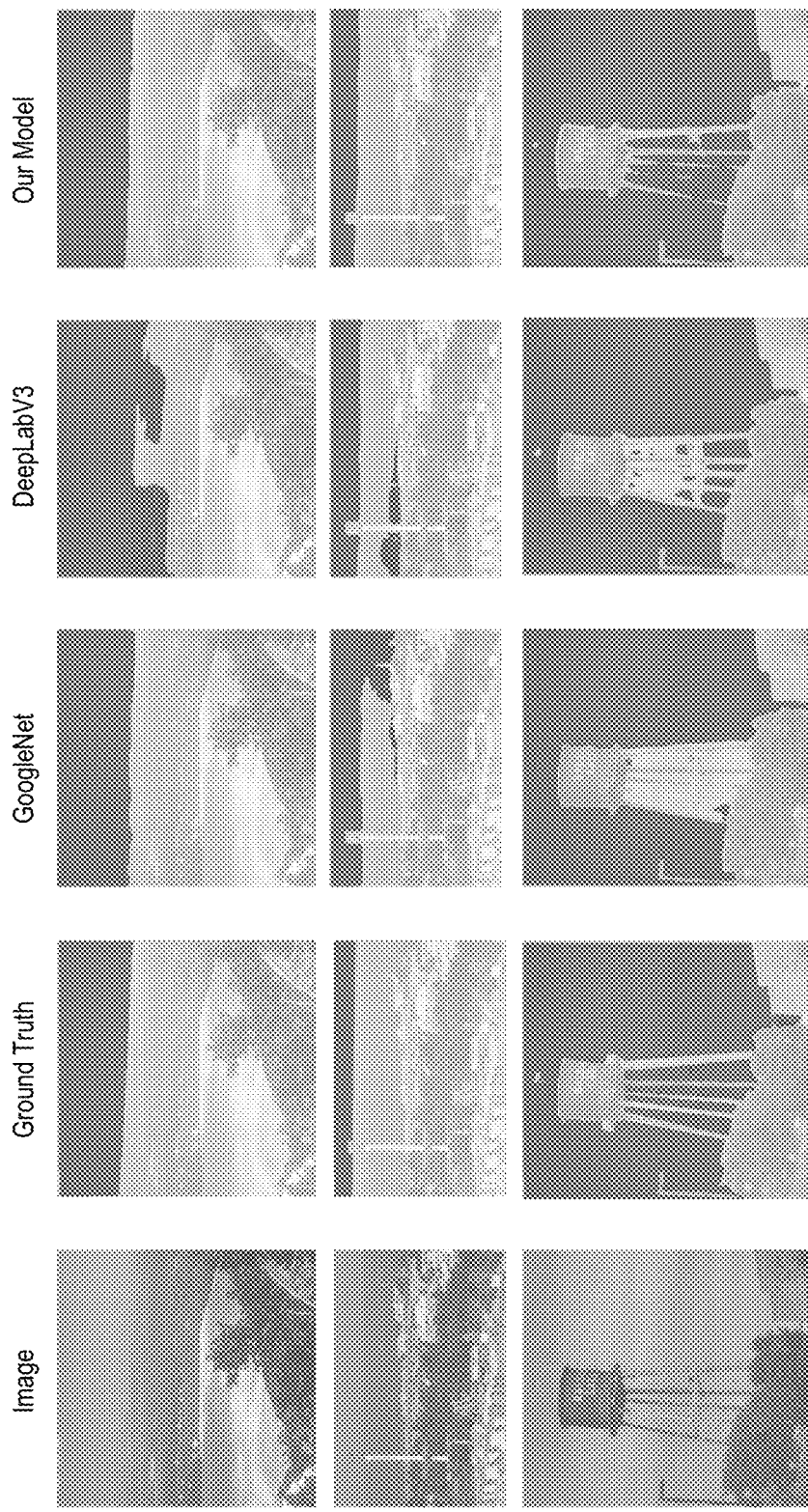
FIGS. 6A-6B illustrate graphical representations reflecting experimental results regarding the effectiveness of the segmentation refinement system in accordance with one or more embodiments.
Figure 6B:
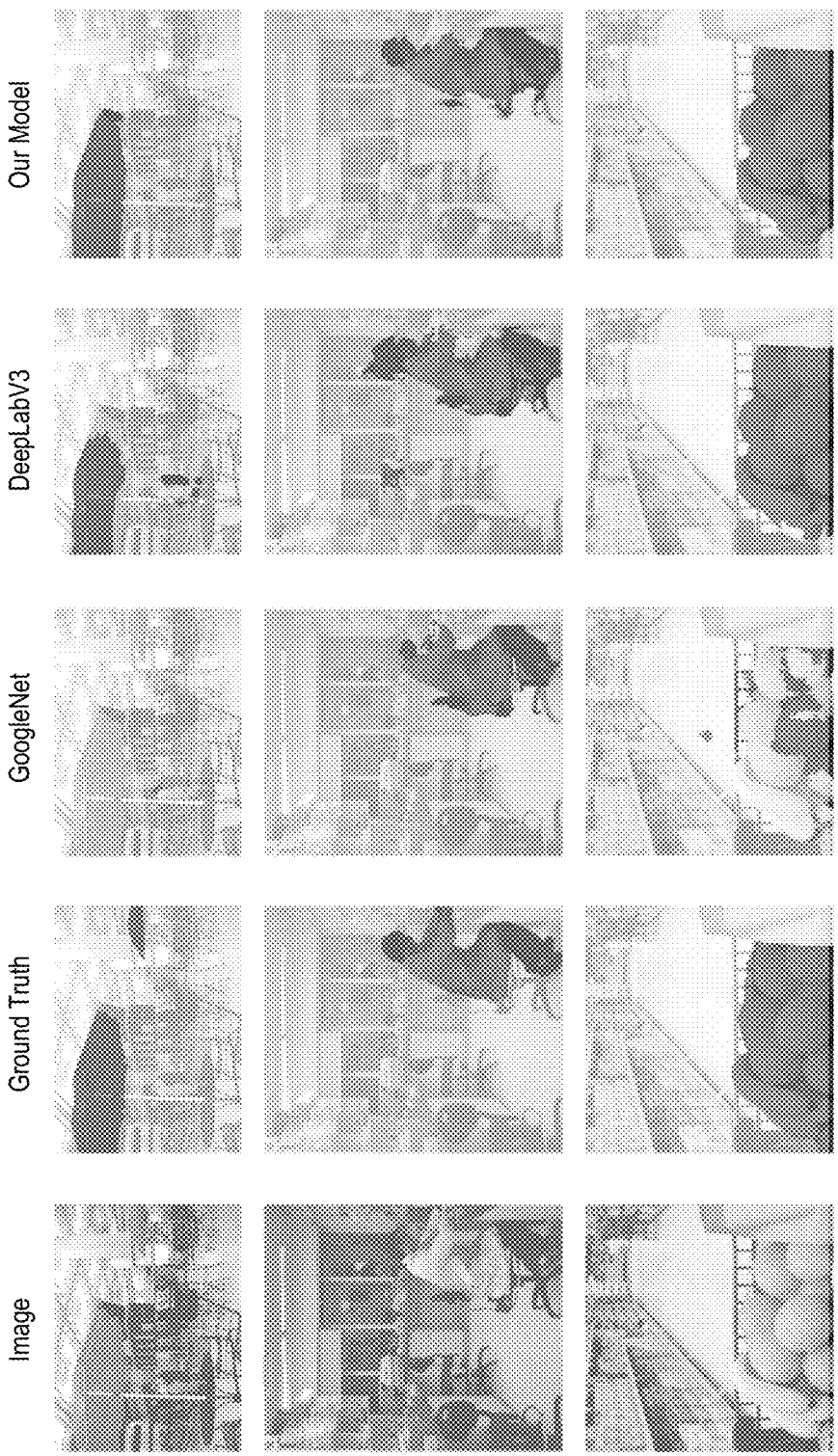

As mentioned above, in one or more embodiments, the segmentation refinement system 106 generates more accurate segmentation masks compared to conventional systems. Researchers have conducted studies to determine the accuracy of one or more embodiments of the segmentation refinement system 106 in generating segmentation masks for digital visual media items. The researchers compared the performance of the segmentation refinement system 106 with the state-of-the art models GoogleNet and Deeplabv3+. FIGS. 6A-6B illustrate graphical representations reflecting experimental results regarding the effectiveness of the segmentation refinement system 106 in accordance with one or more embodiments. FIGS. 7A-7B illustrate tables reflecting additional experimental results regarding the effectiveness of the segmentation refinement system 106 in accordance with one or more embodiments.

Specifically, FIG. 6A illustrates a graphical representation comparing the performance of one embodiment of the segmentation refinement system 106 (labeled as "Our Model") in generating a sky mask for several digital visual media items. FIG. 6B similarly illustrates a graphical representation comparing the performance of an embodiment of the segmentation refinement system 106 in generating a salient mask for several digital visual media items. Both FIGS. 6A-6B compare the segmentation masks generated by each tested model with a ground truth segmentation mask. As shown in FIGS. 6A-6B, the segmentation refinement system 106 generates segmentation masks that more accurately match the ground truths when compared to the GoogleNet and Deeplabv3+ models.

FIG. 7A illustrates a table comparing the performance of an embodiment of the segmentation refinement system 106 against the Deeplabv3+ and GoogleNet models. In particular, the table of FIG. 7A compares the performance on five large scale Salient Object Detection datasets, which contain more than thirty thousand samples with high quality saliency mask annotations in total: COCO-person, Flicker-hp, Flicker-portrait, MSRA10K, and DUT. In particular, FIG. 7A compares the performance of each model in generating segmentation masks for the samples. As shown by the table, the segmentation refinement system 106 outperformed the GoogleNet model across all datasets while achieving results that are comparable to those achieved by the Deeplabv3+ model—a model with a much higher computational cost.

The table of FIG. 7B similarly compares the performance of the segmentation refinement system 106 across the above-mentioned datasets but specifically shows the mean inter-section-over-union metric (mIOU) measured across uncertain areas. The mIOU represents the union of false predictions by all three models in the comparison. As shown by the table of FIG. 7B, the segmentation refinement system 106 significantly outperforms the other models, indicating a significant improvement in analyzing and capturing details, such as the boundaries of objects depicted in digital visual media items.

As further mentioned above, in one or more embodiments, the segmentation refinement system 106 operates more efficiently than conventional systems. FIG. 8 illustrates a table comparing the size of an embodiment of the segmentation refinement system 106 (labeled as "Our Model") with the sizes of the GoogleNet and Deeplabv3+ models. As shown by the table of FIG. 8, the segmentation refinement system 106 is much significantly smaller than the other models. Accordingly, the segmentation refinement system 106 reduces the computational resources required for generating refined segmentation masks. Indeed, by selecting only a portion of the pixels of a segmentation mask to refine, the segmentation refinement system 106 utilizes a more computationally efficient model for segmentation. For example, in some embodiments, the segmentation refinement system 106 refines only a fraction (e.g., one tenth) of the total number of pixels. Further, as mentioned above, in some embodiments, the segmentation refinement system 106 adjusts the employed model (e.g., adjusts the number of refinement iterations performed by the segmentation refinement neural network) to accommodate computing devices with limited computational resources. In some embodiments, the segmentation refinement system 106 can adjust the segmentation refinement neural network to operate on such limited devices without the need to re-train the model, allowing for reduced resource demand.

Figure 9:
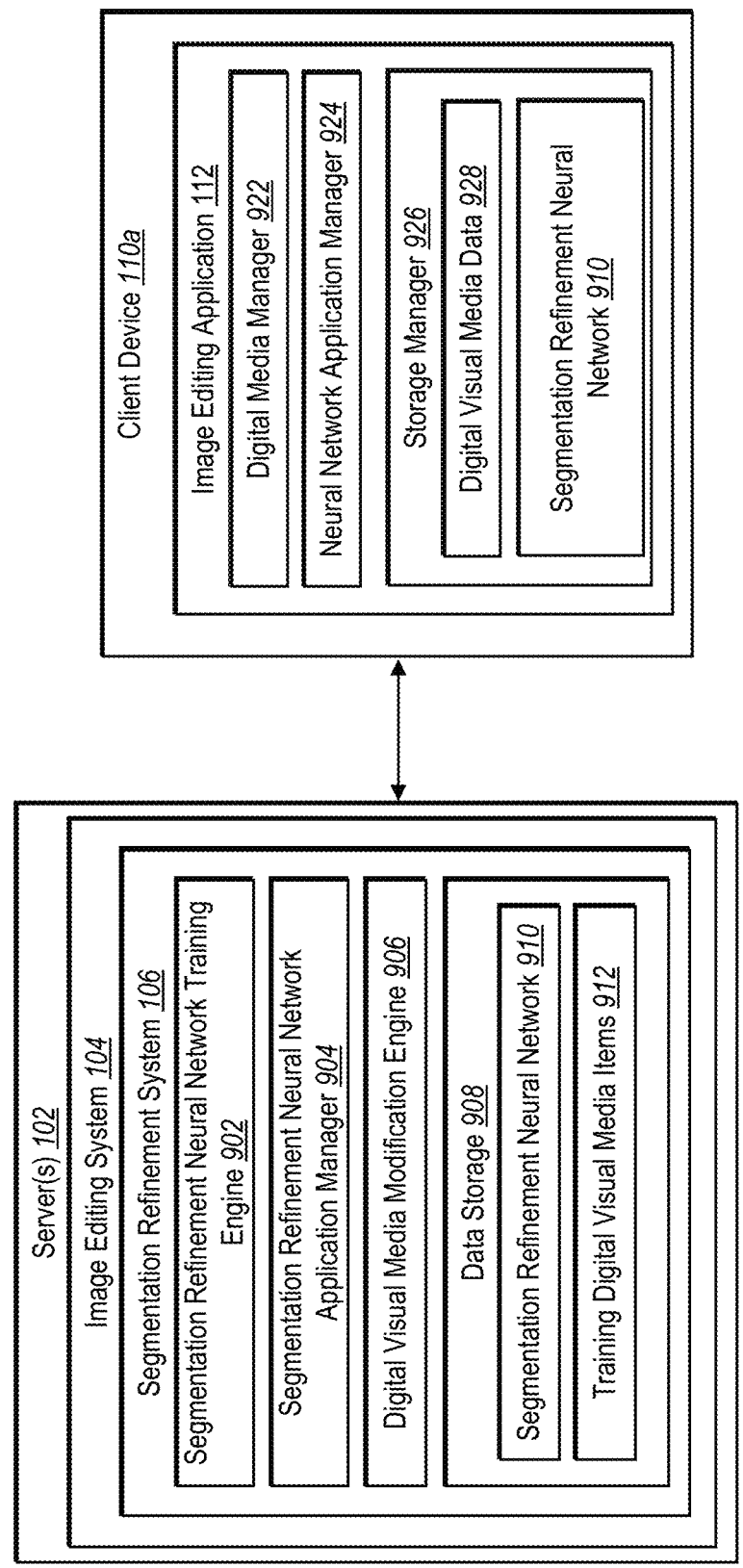
FIG. 9 illustrates an example schematic diagram of a segmentation refinement system in accordance with one or more embodiments.

Turning now to FIG. 9, additional detail will be provided regarding various components and capabilities of the segmentation refinement system 106. In particular, FIG. 9 illustrates the segmentation refinement system 106 implemented by the server(s) 102 and an associated image editing application 112 implemented by a client device 110a. Additionally, the segmentation refinement system 106 is also part of the image editing system 104. As shown, in one or more embodiments, the segmentation refinement system 106 includes, but is not limited to, a segmentation refinement neural network training engine 902, a segmentation refinement neural network application manager 904, a digital visual media modification engine 906, and data storage 908 (which includes the segmentation refinement neural network 910 and training digital visual media items 912). Alternatively, in one or more embodiments, the elements mentioned are all implemented by the client device 104a.

As just mentioned, and as illustrated in FIG. 9, the segmentation refinement system 106 includes the segmentation refinement neural network training engine 902. In one or more embodiments, the segmentation refinement neural network training engine 902 trains a segmentation refinement neural network to generate refined segmentation masks for digital visual media items. For example, in some implementations, the segmentation refinement neural network training engine 902 utilizes training digital visual media items and associated ground truth initial segmentation masks and ground truth uncertain pixels to train the segmentation refinement neural network to generate refined segmentation masks. Indeed, in some implementations, the segmentation refinement neural network learns network weights during the training process.

As further shown in FIG. 9, the segmentation refinement system 106 includes the segmentation refinement neural network application manager 904. In one or more embodiments, the segmentation refinement neural network application manager 904 utilizes the segmentation refinement neural network trained by the segmentation refinement neural network training engine 902. In particular, the segmentation refinement neural network application manager 904 utilizes the segmentation refinement neural network to generate refined segmentation masks for digital visual media items. For example, for a given digital visual media item, the segmentation refinement neural network application manager 904 generates an initial segmentation mask (e.g., using a backbone neural network component, such as a convolutional neural network) and further generates one or more refined segmentation masks based on the initial segmentation mask (e.g., using a refinement neural network component, such as a multi-layer perceptron renderer). In one or more embodiments, the segmentation refinement neural network application manager 904 generates a plurality of refined segmentation masks for a digital visual media item, with each subsequent refined segmentation mask including less uncertain pixels than the previous refined segmentation mask.

Additionally, as shown in FIG. 9, the segmentation refinement system 106 includes the digital visual media modification engine 906. In one or more embodiments, the digital visual media modification engine 906 modifies digital visual media items based on their corresponding refined segmentation mask. For example, in some implementations, the digital visual media modification engine 906 modifies a digital visual media item by applying a filter or other effect to the digital visual media item, by removing one or more object depicted in the digital visual media item, or by replacing a foreground or background depicted in the digital visual media item. In one or more embodiments, the digital visual media modification engine 906 modifies a digital visual media item in response to a user selection or user interaction with a computing device.

Further, as shown in FIG. 9, the segmentation refinement system 106 includes data storage 908. In particular, data storage 908 includes the segmentation refinement neural network 910 and training digital visual media items 912. In one or more embodiments, the segmentation refinement neural network 910 stores the segmentation refinement neural network trained by the segmentation refinement neural network training engine 902 and used by the segmentation refinement neural network application manager 904. In some embodiments, training digital visual media items 912 stores training digital visual media items used by the segmentation refinement neural network training engine 902 to train the segmentation refinement neural network. Though not shown in FIG. 9, in some implementations, training digital visual media items 912 further stores the ground truth initial segmentation masks and the ground truth uncertain pixels corresponding to the stored training digital visual media items.

Furthermore, the client device 110a implements the image editing application 112 with a digital media manager 922, a neural network application manager 924, and a storage manager 926 (that includes digital visual media data 928 and the segmentation refinement neural network 910). Alternatively, in one or more embodiments, the elements mentioned are all implemented by the server(s) 102 or the client device 104a. Furthermore, the elements illustrated in FIG. 9 can be interchanged between the server(s) 102 and the client device 110a.

As mentioned above, and as illustrated in FIG. 9, the client device 110a includes the digital media manager 922. The digital media manager 922 access, identify, modify, revise, and/or provide digital visual media. Furthermore, the digital media manager 922 receives selection information identifying a salient object (e.g., from the neural network application manager 924) and modifies the digital visual media (e.g., modify the salient object foreground pixels and/or background pixels).

For example, the digital media manager 922 modifies digital visual media or a portion of a digital visual media. For example, in one or more embodiments, the digital media manager 922 alters color, brightness, hue, or any other visual characteristic of a target salient object (or background). Similarly, in one or more embodiments, the digital media manager 922 moves, resizes, rotates, or orients a target salient object portrayed in digital visual media. Similarly, in one or more embodiments, the digital media manager 922 isolates, cuts, and/or pastes a target salient object portrayed in digital visual media. Moreover, the digital media manager 922 optionally deletes or removes a salient object (or background) in digital visual media.

Furthermore, the digital media manager 922 also optionally applies one or more filters or styles to digital visual media. For example, the digital media manager 922 independently applies one or more filters or styles to a salient object in the digital visual media. Thus, for instance, the digital media manager 922 applies a first filter to a salient object and apply a second filter to background pixels in digital visual media.

As illustrated in FIG. 9, the deep salient object segmentation system 110 also includes the neural network application manager 924. The neural network application manager 924 accesses, utilizes, or applies a trained neural network (e.g., the segmentation refinement neural network 910). For instance, the neural network application manager 924 utilizes the segmentation refinement neural network 910 to generate a refined segmentation mask of an object portrayed in the digital visual media.

Moreover, as illustrated in FIG. 9, client device 110a also implements the storage manager 926. The storage manager 926 maintains data for the segmentation refinement system 106. The storage manager 926 can maintain data of any type, size, or kind as necessary to perform the functions of the segmentation refinement system 106. The storage manager 926, as shown in FIG. 9, includes the digital visual media data 928 and the segmentation refinement neural network 910.

Digital visual media data 928 can include information for any digital visual media utilized by the segmentation refinement system 106. For example, digital visual media data 928 includes a digital video or digital image (e.g., where the user seeks to select an object portrayed in the foreground of digital visual media). Digital visual media data 928 can also include information generated by the segmentation refinement system 106 regarding digital visual media. For instance, digital visual media data 928 includes a mask for an identified object in digital visual media.

Furthermore, the client device 110a implements the segmentation refinement neural network 910 (e.g., a copy of the segmentation refinement neural network 910 trained or otherwise provided by the segmentation refinement system 106 and described above). The client device 110a utilizes the segmentation refinement neural network 910 to generate a refined segmentation mask of a salient object in one or more digital visual media items.

Each of the components 902-928 of the segmentation refinement system 106 can include software, hardware, or both. For example, the components 902-928 can include one or more instructions stored on a computer-readable storage medium and executable by processors of one or more computing devices, such as a client device or server device. When executed by the one or more processors, the computer-executable instructions of the segmentation refinement system 106 can cause the computing device(s) to perform the methods described herein. Alternatively, the components 902-928 can include hardware, such as a special-purpose processing device to perform a certain function or group of functions. Alternatively, the components 902-928 of the segmentation refinement system 106 can include a combination of computer-executable instructions and hardware.

Furthermore, the components 902-928 of the segmentation refinement system 106 may, for example, be implemented as one or more operating systems, as one or more stand-alone applications, as one or more modules of an application, as one or more plug-ins, as one or more library functions or functions that may be called by other applications, and/or as a cloud-computing model. Thus, the components 902-928 of the segmentation refinement system 106 may be implemented as a stand-alone application, such as a desktop or mobile application. Furthermore, the components 902-928 of the segmentation refinement system 106 may be implemented as one or more web-based applications hosted on a remote server. Alternatively, or additionally, the components 902-928 of the segmentation refinement system 106 may be implemented in a suite of mobile device applications or "apps." For example, in one or more embodiments, the segmentation refinement system 106 can comprise or operate in connection with digital software applications such as ADOBE® CREATIVE CLOUD® or ADOBE® PHOTOSHOP® CAMERA. "ADOBE," "CREATIVE CLOUD," and "PHOTOSHOP" are either registered trademarks or trademarks of Adobe Inc. in the United States and/or other countries.

Figure 10:
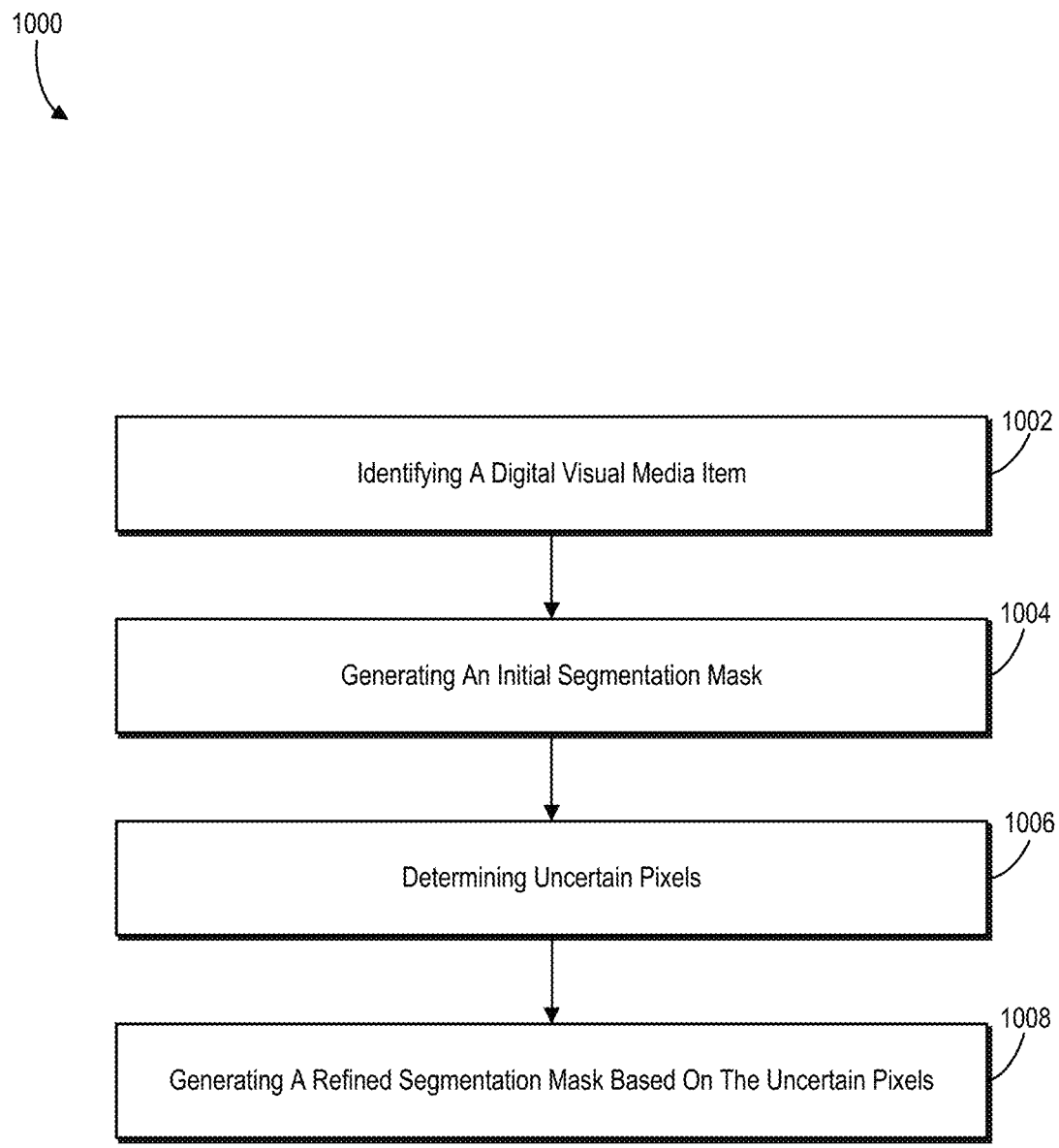
FIG. 10 illustrates a flowchart of a series of acts for generating a refined segmentation mask for a digital visual media item in accordance with one or more embodiments.

FIGS. 1-9, the corresponding text and the examples provide a number of different methods, systems, devices, and non-transitory computer-readable media of the segmentation refinement system 106. In addition to the foregoing, one or more embodiments can also be described in terms of flowcharts comprising acts for accomplishing the particular result, as shown in FIG. 10. FIG. 10 may be performed with more or fewer acts. Further, the acts may be performed in different orders. Additionally, the acts described herein may be repeated or performed in parallel with one another or in parallel with different instances of the same or similar acts.

FIG. 10 illustrates a flowchart of a series of acts 1000 for generating a refined segmentation mask for a digital visual media item in accordance with one or more embodiments. While FIG. 10 illustrates acts according to one embodiment, alternative embodiments may omit, add to, reorder, and/or modify any of the acts shown in FIG. 10. In some implementations, the acts of FIG. 10 are performed as part of a method. For example, in some embodiments, the acts of FIG. 10 are performed, in a digital medium environment for editing digital visual media, as part of a computer-implemented method for generating segmentation masks. Alternatively, a non-transitory computer-readable medium can store instructions thereon that, when executed by at least one processor, cause a computing device to perform the acts of FIG. 10. In some embodiments, a system performs the acts of FIG. 10. For example, in one or more embodiments, a system includes at least one memory device comprising a segmentation refinement neural network. The system further includes at least one server device configured to cause the system to perform the acts of FIG. 10.

The series of acts 1000 includes an act 1002 of identifying a digital visual media item. For example, in some embodiments, the act 1002 involves identifying a digital visual media item comprising a plurality of pixels, the digital visual media item depicting one or more objects. To illustrate, in some implementations, the act 1002 involves receiving a digital visual media item comprising a plurality of pixels and depicting one or more objects. Indeed, in some instances, the act 1002 involves receiving a digital visual media item from a computing device.

In some embodiments, the digital visual media item comprises a digital video feed. In further embodiments, the digital visual media item comprises a digital photo or a (e.g., pre-recorded) digital video.

The series of acts 1000 also includes an act 1004 of generating an initial segmentation mask. For example, in one or more embodiments, the act 1004 involves utilizing a segmentation refinement neural network to generate an initial segmentation mask for the digital visual media item by determining whether the plurality of pixels correspond to the one or more objects. In one or more embodiments, the segmentation refinement system 106 utilizes the segmentation refinement neural network to generate the initial segmentation mask based on the final feature map by utilizing a convolutional neural network to generate the initial segmentation mask In one or more embodiments, such as where the digital visual media item includes a digital video feed, the segmentation refinement system 106 utilizes the segmentation refinement neural network to generate the initial segmentation mask for the digital visual media item by utilizing the segmentation refinement neural network to generate the initial segmentation mask for a video frame of the digital video feed.

In one or more embodiments, the segmentation refinement system 106 generates the initial segmentation mask based on a set of feature maps. Indeed, in some instances, the segmentation refinement system 106 utilizes the segmentation refinement neural network to generate a set of feature maps corresponding to the digital visual media item comprising a set of initial feature maps and a final feature map. For example, in one or more embodiments, the segmentation refinement system 106 utilizes the segmentation refinement neural network to generate one or more initial feature maps comprising low-level feature values corresponding to the digital visual media item; and generate, based on the one or more initial feature maps, a final feature map comprising high-level feature values corresponding to the digital visual media item. Accordingly, in some embodiments, the segmentation refinement system 106 utilizes the segmentation refinement neural network to generate the initial segmentation mask for the digital visual media item by utilizing the segmentation refinement neural network to generate the initial segmentation mask based on the final feature map. To illustrate, in some embodiments, the segmentation refinement system 106 utilizes the segmentation refinement neural network to generate the initial segmentation mask by determining whether the plurality of pixels correspond to the one or more objects based on the final feature map.

The series of acts 1000 further includes an act 1006 of determining uncertain pixels. For instance, in some embodiments, the act 1006 involves utilizing the segmentation refinement neural network to further determine, based on the initial segmentation mask, uncertain pixels, the uncertain pixels having an associated uncertainty that the uncertain pixels correspond to the one or more objects or do not correspond to the one or more objects. Indeed, in some implementations, the segmentation refinement system 106 generates an initial segmentation mask corresponding to the digital visual media item, the initial segmentation mask comprising uncertain pixels. Accordingly, the segmentation refinement system 106 determines or identifies the uncertain pixels.

In one or more embodiments, the segmentation refinement system 106 determines the uncertain pixels by generating an uncertainty map that identifies the uncertain pixels and further identifies certain pixels having an associated certainty that the certain pixels correspond to the one or more objects or do not correspond to the one or more objects. For example, in some implementations, the segmentation refinement system 106 utilizes the segmentation refinement neural network to determine the uncertain pixels by generating, based on the final feature map and the initial segmentation mask, an uncertainty map that provides uncertainty scores for pixels of the initial segmentation mask utilizing one or more neural network layers having learned network weights.

Additionally, the series of acts 1000 includes an act 1008 of generating a refined segmentation mask based on the uncertain pixels. For example, in one or more embodiments, the act 1008 involves utilizing the segmentation refinement neural network to further generate a refined segmentation mask for the digital visual media item by redetermining whether a set of uncertain pixels correspond to the one or more objects. In some embodiments, the segmentation refinement system 106 identifies the set of uncertain pixels from the uncertain pixels based on a ranking of the uncertainty scores provided by the uncertainty map. In one or more embodiments, the segmentation refinement system 106 utilizes the segmentation refinement neural network to generate the refined segmentation mask for the digital visual media item by utilizing a multi-layer perceptron renderer to generate the refined segmentation mask.

In some implementations, the segmentation refinement system 106 utilizes the segmentation refinement neural network to generate the refined segmentation mask for the digital visual media item by utilizing the segmentation refinement neural network to generate a sky mask corresponding to the digital visual media item or a salient mask corresponding to the digital visual media item.

In one or more embodiments, determining whether the plurality of pixels correspond to the one or more objects comprises generating probabilities that the plurality of pixels correspond to the one or more objects. Likewise, in some embodiments, redetermining whether the set of uncertain pixels correspond to the one or more objects comprises generating updated probabilities that the plurality of pixels correspond to the one or more objects.

In one or more embodiments, the segmentation refinement system 106 redetermines whether the set of uncertain pixels correspond to the one or more objects based on feature values associated with the feature maps. For example, in some embodiments, the segmentation refinement system 106 utilizes the segmentation refinement neural network to extract, from the set of initial feature maps, feature values associated with the uncertain pixels; and generate a refined segmentation mask for the digital visual media item by redetermining whether a set of uncertain pixels correspond to the one or more objects based on the feature values associated with the uncertain pixels. In some embodiments, the segmentation refinement system 106 utilizes the segmentation refinement neural network to extract, from the low-level feature values (e.g., of the initial feature maps), a subset of low-level feature values associated with the set of uncertain pixels; and extract, from the high-level feature values (e.g., of the final feature map), a subset of high-level feature values associated with the set of uncertain pixels. Accordingly, in such embodiments, redetermining whether the set of uncertain pixels correspond to the one or more objects comprises redetermining whether the set of uncertain pixels correspond to the one or more objects based on the subset of low-level feature values and the subset of high-level feature values.

In some implementations, the segmentation refinement system 106 utilizes the segmentation refinement neural network to generate the refined segmentation mask for the digital visual media item further based on feature values associated with the certain pixels identified by the uncertainty map. To illustrate, in one or more embodiments, the segmentation refinement system 106 utilizes the segmentation refinement neural network to extract, from the set of initial feature maps, feature values associated with the uncertain pixels. Further, the segmentation refinement system 106 utilizes the segmentation refinement neural network to extract, from the final feature map, additional feature values associated with the uncertain pixels; and extract, from the final feature map, feature values associated with certain pixels having an associated certainty that the certain pixels correspond to the one or more objects or do not correspond to the one or more objects. Accordingly, in some embodiments, redetermining whether the set of uncertain pixels correspond to the one or more objects comprises: redetermining whether the set of uncertain pixels correspond to the one or more objects based on the feature values associated with the uncertain pixels and the additional feature values associated with the uncertain pixels; and redetermining whether the certain pixels correspond to the one or more objects based on the feature values associated with the certain pixels.

In one or more embodiments, the series of acts 1000 further includes acts for generating additional refined segmentation masks. For example, in one or more embodiments, the segmentation refinement system 106 utilizes the segmentation refinement neural network to determine, based on the refined segmentation mask, additional uncertain pixels that correspond to a subset of the uncertain pixels; and generate an additional refined segmentation mask for the digital visual media item by redetermining whether a set of additional uncertain pixels correspond to the one or more objects. In some implementations, such as when the digital visual media item includes a digital video feed, the segmentation refinement system 106 utilizes the segmentation refinement neural network to generate the refined segmentation mask for the digital visual media item by utilizing the segmentation refinement neural network to generate the refined segmentation mask for a first video frame of the digital video feed. Accordingly, in such implementations, the segmentation refinement system 106 further utilizes the segmentation refinement neural network to generate an additional refined segmentation mask for a second video frame of the digital video feed based on the refined segmentation mask.

In some embodiments, the series of acts 1000 include acts for generating initial segmentation masks and refined segmentation masks of varying resolutions. For example, in one or more embodiments, the digital visual media item is associated with a first resolution. Accordingly, the segmentation refinement system 106 utilizes the segmentation refinement neural network to generate the initial segmentation mask by utilizing the segmentation refinement neural network to generate the initial segmentation mask having a second resolution that is lower than the first resolution; and utilizes the segmentation refinement neural network to generate the refined segmentation mask by utilizing the segmentation refinement neural network to generate the refined segmentation mask having a third resolution that is higher than the second resolution.

In some embodiments, the series of acts 1000 further includes acts for modifying the digital visual media item. In particular, as mentioned, the segmentation refinement system 106 modifies (e.g., refines) the initial segmentation mask generated for a digital visual media item. Accordingly, in some instances, the segmentation refinement system 106 modifies the digital visual media item utilizing the modified initial segmentation mask. More particularly, in some instances, the segmentation refinement system 106 modifies the digital visual media item based on the refined segmentation mask.

Further, as discussed above, the segmentation refinement system 106 is implemented on a mobile device in some implementations. Accordingly, in some embodiments, the segmentation refinement system 106 receives a digital visual media item from a computing device, wherein the computing device comprises a mobile device. Further, in some embodiments, the segmentation refinement system 106 generates the initial segmentation mask corresponding to the digital visual media item by generating the initial segmentation mask at the mobile device. Further, the segmentation refinement system 106 can generate the refined segmentation mask at the mobile device.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed by a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multiprocessor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 11:
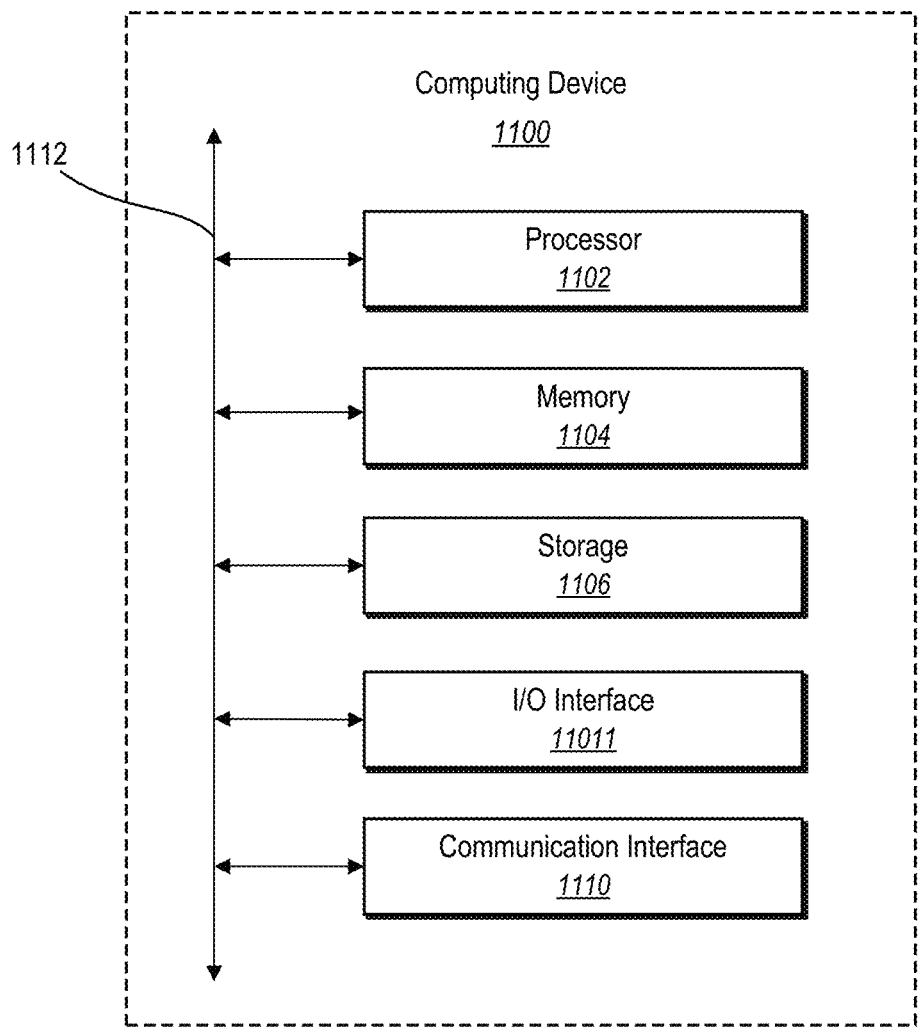
FIG. 11 illustrates a block diagram of an exemplary computing device in accordance with one or more embodiments.

FIG. 11 illustrates a block diagram of an example computing device 1100 that may be configured to perform one or more of the processes described above. One will appreciate that one or more computing devices, such as the computing device 1100 may represent the computing devices described above (e.g., the server(s) 102 and/or the client devices 110a-110n). In one or more embodiments, the computing device 1100 may be a mobile device (e.g., a mobile telephone, a smartphone, a PDA, a tablet, a laptop, a camera, a tracker, a watch, a wearable device). In some embodiments, the computing device 1100 may be a non-mobile device (e.g., a desktop computer or another type of client device). Further, the computing device 1100 may be a server device that includes cloud-based processing and storage capabilities.

As shown in FIG. 11, the computing device 1100 can include one or more processor(s) 1102, memory 1104, a storage device 1106, input/output interfaces 1108 (or "I/O interfaces 1108"), and a communication interface 1110, which may be communicatively coupled by way of a communication infrastructure (e.g., bus 1112). While the computing device 1100 is shown in FIG. 11, the components illustrated in FIG. 11 are not intended to be limiting. Additional or alternative components may be used in other embodiments. Furthermore, in certain embodiments, the computing device 1100 includes fewer components than those shown in FIG. 11. Components of the computing device 1100 shown in FIG. 11 will now be described in additional detail.

In particular embodiments, the processor(s) 1102 includes hardware for executing instructions, such as those making up a computer program. As an example, and not by way of limitation, to execute instructions, the processor(s) 1102 may retrieve (or fetch) the instructions from an internal register, an internal cache, memory 1104, or a storage device 1106 and decode and execute them.

The computing device 1100 includes memory 1104, which is coupled to the processor(s) 1102. The memory 1104 may be used for storing data, metadata, and programs for execution by the processor(s). The memory 1104 may include one or more of volatile and non-volatile memories, such as Random-Access Memory ("RAM"), Read-Only Memory ("ROM"), a solid-state disk ("SSD"), Flash, Phase Change Memory ("PCM"), or other types of data storage. The memory 1104 may be internal or distributed memory.

The computing device 1100 includes a storage device 1106 including storage for storing data or instructions. As an example, and not by way of limitation, the storage device 1106 can include a non-transitory storage medium described above. The storage device 1106 may include a hard disk drive (HDD), flash memory, a Universal Serial Bus (USB) drive or a combination these or other storage devices.

As shown, the computing device 1100 includes one or more I/O interfaces 1108, which are provided to allow a user to provide input to (such as user strokes), receive output from, and otherwise transfer data to and from the computing device 1100. These I/O interfaces 1108 may include a mouse, keypad or a keyboard, a touch screen, camera, optical scanner, network interface, modem, other known I/O devices or a combination of such I/O interfaces 1108. The touch screen may be activated with a stylus or a finger.

The I/O interfaces 1108 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O interfaces 1108 are configured to provide graphical data to a display for presentation to a user. The graphical data may be representative of one or more graphical user interfaces and/or any other graphical content as may serve a particular implementation.

The computing device 1100 can further include a communication interface 1110. The communication interface 1110 can include hardware, software, or both. The communication interface 1110 provides one or more interfaces for communication (such as, for example, packet-based communication) between the computing device and one or more other computing devices or one or more networks. As an example, and not by way of limitation, communication interface 1110 may include a network interface controller (NIC) or network adapter for communicating with an Ethernet or other wire-based network or a wireless NIC (WNIC) or wireless adapter for communicating with a wireless network, such as a WI-FI. The computing device 1100 can further include a bus 1112. The bus 1112 can include hardware, software, or both that connects components of computing device 1100 to each other.

In the foregoing specification, the invention has been described with reference to specific example embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel to one another or in parallel to different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. A method comprising:
receiving a digital visual media item portraying an object;
generating, utilizing a segmentation refinement neural network, an initial segmentation mask for the digital visual media item;

determining, utilizing the segmentation refinement neural network, a set of pixels having an associated classification from the initial segmentation mask; and generating a refined segmentation mask for the digital visual media item by utilizing the segmentation refinement neural network to iteratively refine the initial segmentation mask by iteratively refining the set of pixels having the associated classification from the initial segmentation mask.

2. The method of claim 1, wherein:

determining, utilizing the segmentation refinement neural network, the set of pixels having the associated classification from the initial segmentation mask comprises determining, utilizing the segmentation refinement neural network, uncertain pixels having an uncertain classification from the initial segmentation mask; and utilizing the segmentation refinement neural network to iteratively refine the initial segmentation mask comprises utilizing the segmentation refinement neural network to iteratively refine the uncertain pixels from the initial segmentation mask.

3. The method of claim 2, wherein determining, utilizing the segmentation refinement neural network, the uncertain pixels from the initial segmentation mask comprises:

generating, utilizing the segmentation refinement neural network, an uncertainty map comprising uncertainty scores for pixels of the initial segmentation mask; and determining the uncertain pixels from the initial segmentation mask based on the uncertainty scores of the uncertainty map.

4. The method of claim 1, wherein generating the refined segmentation mask for the digital visual media item by utilizing the segmentation refinement neural network to iteratively refine the initial segmentation mask comprises:

generating a first refined segmentation mask for the digital visual media item by utilizing the segmentation refinement neural network to refine the initial segmentation mask; and generating a second refined segmentation mask for the digital visual media item by utilizing the segmentation refinement neural network to refine the first refined segmentation mask.

5. The method of claim 1, further comprising generating, utilizing the segmentation refinement neural network, a set of feature maps corresponding to the digital visual media item, wherein generating, utilizing the segmentation refinement neural network, the initial segmentation mask for the digital visual media item comprises generating, utilizing the segmentation refinement neural network, the initial segmentation mask based on the set of feature maps.

6. The method of claim 5, wherein generating, utilizing the segmentation refinement neural network, the set of feature maps corresponding to the digital visual media item comprises utilizing the segmentation refinement neural network to:

generate an initial feature map from the digital visual media item;

generate an additional initial feature map from the initial feature map; and generate a final feature map from the additional initial feature map.

7. The method of claim 6, wherein:

generating the initial feature map comprises generating a first set of low-level feature values corresponding to local attributes of the digital visual media item;

generating the additional initial feature map comprises generating a second set of low-level feature values corresponding to the local attributes of the digital visual media item, the second set of low-level feature values comprising a higher level of feature values than the first set of low-level feature values; and generating the final feature map comprises generating a set of high-level feature values corresponding to global attributes of the digital visual media item.

8. The method of claim 1, wherein:

generating, utilizing the segmentation refinement neural network, the initial segmentation mask for the digital visual media item comprises generating, utilizing the segmentation refinement neural network the initial segmentation mask indicating a location and a rough shape of the object portrayed in the digital visual media item; and generating the refined segmentation mask for the digital visual media item by utilizing the segmentation refinement neural network to iteratively refine the initial segmentation mask comprises generating the refined segmentation mask by utilizing the segmentation refinement neural network to iteratively recapture local details associated with the object portrayed in the digital visual media item.

9. The method of claim 1, further comprising:

providing the digital visual media item and one or more modification elements for display via a graphical user interface of a computing device;

receiving, via the graphical user interface, a user interaction with the one or more modification elements, wherein generating the initial segmentation mask and the refined segmentation mask is in response to receiving the user interaction;

modifying the digital visual media item utilizing the refined segmentation mask; and providing the modified digital visual media item for display via the graphical user interface.

10. A non-transitory computer-readable medium storing instructions thereon that, when executed by at least one processor, cause the at least one processor to perform operations comprising:

receiving a digital visual media item comprising a plurality of pixels, the digital visual media item portraying an object;

generating, utilizing a segmentation refinement neural network, an initial segmentation mask that classifies pixels from the plurality of pixels as corresponding to the object or not corresponding to the object;

determining uncertain pixels that have an associated uncertainty that the uncertain pixels have been classified correctly within the initial segmentation mask; and generating a refined segmentation mask for the digital visual media item by utilizing the segmentation refinement neural network to iteratively refine the uncertain pixels.

11. The non-transitory computer-readable medium of claim 10, wherein utilizing the segmentation refinement neural network to iteratively refine the uncertain pixels comprises utilizing the segmentation refinement neural network to iteratively reclassify at least a subset of uncertain pixels from the uncertain pixels as corresponding to the object or not corresponding to the object.

12. The non-transitory computer-readable medium of claim 10, further comprising instructions that, when executed by the at least one processor, cause the at least one processor to perform operations comprising:

generating, utilizing the segmentation refinement neural network, an uncertainty map comprising uncertainty scores for pixels of the initial segmentation mask; and determining a ranking for the uncertainty scores of the uncertainty map, wherein determining the uncertain pixels comprises determining the uncertain pixels based on the ranking of the uncertainty scores from the uncertainty map.

13. The non-transitory computer-readable medium of claim 12, further comprising instructions that, when executed by the at least one processor, cause the at least one processor to perform operations comprising:

generating, utilizing the segmentation refinement neural network, a feature map from the digital visual media item; and combining the feature map and the initial segmentation mask to generate a combined map, wherein generating, utilizing the segmentation refinement neural network, the uncertainty map comprises generating, utilizing the segmentation refinement neural network, the uncertainty map from the combined map.

14. The non-transitory computer-readable medium of claim 10, wherein generating the refined segmentation mask for the digital visual media item comprises generating the refined segmentation mask for a video frame of a digital video feed; and further comprising instructions that, when executed by the at least one processor, cause the at least one processor to perform operations comprising:

generating, utilizing the segmentation refinement neural network, a plurality of additional refined segmentation masks for a plurality of additional video frames of the digital video feed; and modifying the digital video feed utilizing the refined segmentation mask and the plurality of additional refined segmentation masks.

15. A system comprising:

one or more memory components; and one or more processing devices coupled to the one or more memory components, the one or more processing devices to perform operations comprising utilizing a segmentation refinement neural network to:

extract, from a digital visual media item, a set of feature maps comprising feature values corresponding to the digital visual media item;

generate, utilizing at least one feature map from the set of feature maps, an initial segmentation mask that classifies pixels of the digital visual media item as corresponding to an object portrayed in the digital visual media item or not corresponding to the object;

determine, utilizing the at least one feature map, uncertain pixels that have an associated uncertainty that the uncertain pixels have been classified correctly within the initial segmentation mask; and generate, utilizing the at least one feature map, a refined segmentation mask for the digital visual media item by iteratively refining the uncertain pixels.

16. The system of claim 15, wherein the one or more processing devices:

extract the set of feature maps by extracting, from the digital visual media item, a set of initial feature maps comprising low-level feature values corresponding to the digital visual media item; and generate, utilizing the at least one feature map, the refined segmentation mask for the digital visual media item by iteratively refining the uncertain pixels by, for a given iteration:

extracting, from the set of initial feature maps, a subset of low-level feature values that correspond to the uncertain pixels; and refining the uncertain pixels utilizing the subset of low-level feature values.

17. The system of claim 16, wherein the one or more processing devices:

extract the set of feature maps by extracting, from the digital visual media item, a final feature map comprising high-level feature values corresponding to the digital visual media item; and generate, utilizing the at least one feature map, the refined segmentation mask for the digital visual media item by iteratively refining the uncertain pixels by, for the given iteration:

extracting, from the final feature map, a subset of high-level feature values that correspond to the uncertain pixels; and refining the uncertain pixels utilizing the subset of high-level feature values.

18. The system of claim 17, wherein the one or more processing devices generate, utilizing the at least one feature map, the refined segmentation mask for the digital visual media item by iteratively refining the uncertain pixels by, for the given iteration:

extracting, from the final feature map, an additional subset of high-level feature values that correspond to certain pixels that have an associated certainty that the certain pixels have been classified correctly within the initial segmentation mask; and refining the uncertain pixels utilizing the additional subset of high-level feature values.

19. The system of claim 18, wherein the one or more processing devices generate, utilizing the at least one feature map, the refined segmentation mask for the digital visual media item by iteratively refining the uncertain pixels by, for the given iteration:

generating a convolutional output from the subset of low-level feature maps utilizing a convolutional layer;

combining the convolutional output with the subset of high-level feature values and the additional subset of high-level feature values to generate a combined map; and refining the uncertain pixels utilizing the combined map.

20. The system of claim 15, wherein the one or more processing devices generate, utilizing the at least one feature map, the refined segmentation mask for the digital visual media item by iteratively refining the uncertain pixels by iteratively generating a plurality of refined segmentation masks, where one or more refined segmentation masks from the plurality of refined segmentation masks comprises a reclassification of at least a subset of the uncertain pixels based on a previously generated refined segmentation mask.

* * * * *